US009276987B1

(12) United States Patent
Sirota et al.

(10) Patent No.: US 9,276,987 B1
(45) Date of Patent: *Mar. 1, 2016

(54) IDENTIFYING NODES ALREADY STORING INDICATED INPUT DATA TO PERFORM DISTRIBUTED EXECUTION OF AN INDICATED PROGRAM IN A NODE CLUSTER

(71) Applicant: Amazon Technologies, Inc., Reno, NV (US)

(72) Inventors: Peter Sirota, Seattle, WA (US); Richendra Khanna, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/794,220

(22) Filed: Mar. 11, 2013

Related U.S. Application Data

(63) Continuation of application No. 12/476,561, filed on Jun. 2, 2009, now Pat. No. 8,418,181.

(51) Int. Cl.
G06F 9/46 (2006.01)
G06F 15/16 (2006.01)
G06F 15/173 (2006.01)
H04L 29/08 (2006.01)
G06F 9/50 (2006.01)

(52) U.S. Cl.
CPC .............. *H04L 67/00* (2013.01); *G06F 9/5033* (2013.01)

(58) Field of Classification Search
None
See application file for complete search history.

(56) References Cited

U.S. PATENT DOCUMENTS

| | | | |
|---|---|---|---|
| 5,815,649 A * | 9/1998 | Utter et al. | 714/6.11 |
| 7,107,323 B2 | 9/2006 | Hara et al. | |
| 7,318,128 B1 * | 1/2008 | Dice | 711/151 |
| 7,325,041 B2 | 1/2008 | Hara et al. | |
| 7,596,788 B1 * | 9/2009 | Shpigelman | 718/100 |
| 7,975,001 B1 | 7/2011 | Stefansson et al. | |
| 8,108,258 B1 * | 1/2012 | Slattery et al. | 705/19 |
| 8,150,889 B1 | 4/2012 | Bacthavachalu et al. | |
| 8,418,181 B1 * | 4/2013 | Sirota et al. | 718/102 |
| 2003/0191795 A1 | 10/2003 | Bernardin et al. | |
| 2004/0049531 A1 * | 3/2004 | Honda et al. | 709/201 |

(Continued)

OTHER PUBLICATIONS

"AmazonEC2—Hadoop Wiki," retrieved on Dec. 12, 2008 from wiki.apache.org/hadoop/AmazonEC2?action=print, 10 pages.

(Continued)

*Primary Examiner* — Meng An
*Assistant Examiner* — Jorge A Chu Joy-Davila
(74) *Attorney, Agent, or Firm* — Seed IP Law Group PLLC

(57) ABSTRACT

Techniques are described for managing execution of programs, such as for distributed execution of a program on multiple computing nodes. In some situations, the techniques include selecting a cluster of computing nodes to use for executing a program based at least in part on data to be used during the program execution. For example, the computing node selection for a particular program may be performed so as to attempt to identify and use computing nodes that already locally store some or all of the input data that will be used by those computing nodes as part of the executing of that program on those nodes. Such techniques may provide benefits in a variety of situations, including when the size of input datasets to be used by a program are large, and the transferring of data to and/or from computing nodes may impose large delays and/or monetary costs.

22 Claims, 11 Drawing Sheets

(56) References Cited

U.S. PATENT DOCUMENTS

| | | | |
|---|---|---|---|
| 2004/0205109 | A1 | 10/2004 | Hara et al. |
| 2007/0240160 | A1* | 10/2007 | Paterson-Jones et al. .... 718/104 |
| 2007/0277056 | A1* | 11/2007 | Varadarajan et al. .......... 714/15 |
| 2008/0270363 | A1 | 10/2008 | Hunt et al. |
| 2010/0161778 | A1 | 6/2010 | Guinard et al. |
| 2010/0228861 | A1 | 9/2010 | Arsovski et al. |
| 2010/0241614 | A1 | 9/2010 | Shaull et al. |

OTHER PUBLICATIONS

"Hadoop," retrieved on Dec. 12, 2008, from en.wikipedia.org/wiki/Hadoop, 5 pages.

"MapReduce," retrieved on Dec. 12, 2008, from en.wikipedia.org/wiki/Mapreduce, 6 pages.

"Storage Area Network," retrieved on Dec. 12, 2008, from en.wikipedia.org/wiki/Storage_area_network, 5 pages.

"RAID," retrieved on Dec. 12, 2008, from http://en.wikipedia.org/wiki/RAID, 14 pages.

Varia, J., "Building GrepTheWeb in the Cloud, Part 1: Cloud Architectures," Jul. 16, 2008, retrieved Dec. 12, 2008, from developer.amazonwebservices.com/connect/entry!default.jspa?categoryID=152&ex . . . , 8 pages.

Varia, J., "Building GrepTheWeb in the Cloud, Part 2: Best Practices," Jul. 15, 2008, retrieved Dec. 12, 2008, from developer.amazonwebservices.com/connect/entry!default.jspa?categoryID=152&ex . . . , 3 pages.

White, T., "Running Hadoop MapReduce on Amazon EC2 and Amazon S3," Jul. 18, 2007, retrieved Dec. 12, 2008, from developer.amazonwebservices.com/connect/entry.jspa?externalID=873, 7 pages.

"Condor Project Homepage," retrieved on Mar. 26, 2009, from www.cs.wisc.edu/condor/, 3 pages.

"What is Condor?" retrieved on Mar. 26, 2009, from www.cs.wisc.edu/condor/description.html, 2 pages.

"An Overview of the Condor System," retrieved on Mar. 26, 2009, from www.cs.wisc.edu/condor/overview/, 4 pages.

"Welcome to Hive!" retrieved on Mar. 26, 2009, from hadoop.apache.org/hive/, 1 page.

"Hive—Hadoop Wiki," retrieved on Mar. 26, 2009, from wiki.apache.org/hadoop/Hive?action=print, 2 pages.

"Project Pig," retrieved on Mar. 26, 2009, research.yahoo.com/node/90, 1 page.

Olston, C., et al, "Pig Latin: A Not-So-Foreign Language for Data Processing," SIGMOD, Jun. 9-12, 2008, Vancouver, BC, Canada, 12 pages.

"Hadoop on Demand," retrieved on Apr. 2, 2009, from hadoop.apache.org/core/docs/r0.17.2/hod.html, 1 page.

"Hadoop on Demand: Overview," retrieved on Apr. 2, 2009, from hadoop.apache.org/core/docs/r0.17.2/hodadmin_guide.html, 6 pages.

"Hadoop on Demand: Configuration Guide," retrieved on Apr. 2, 2009, from hadoop.apache.org/core/docs/r0.17.2/hod_config_guide.html, 4 pages.

"Hadoop on Demand User Guide," retrieved on Apr. 2, 2009, from hadoop.apache.org/core/docs/r0.17.2/hod_user_guide.html, 10 pages.

"Hadoop on Demand: Wiki," retrieved on Apr. 2, 2009, from wiki.huihoo.com/index.php?title=Hadoop_On_Demand, 2 pages.

* cited by examiner

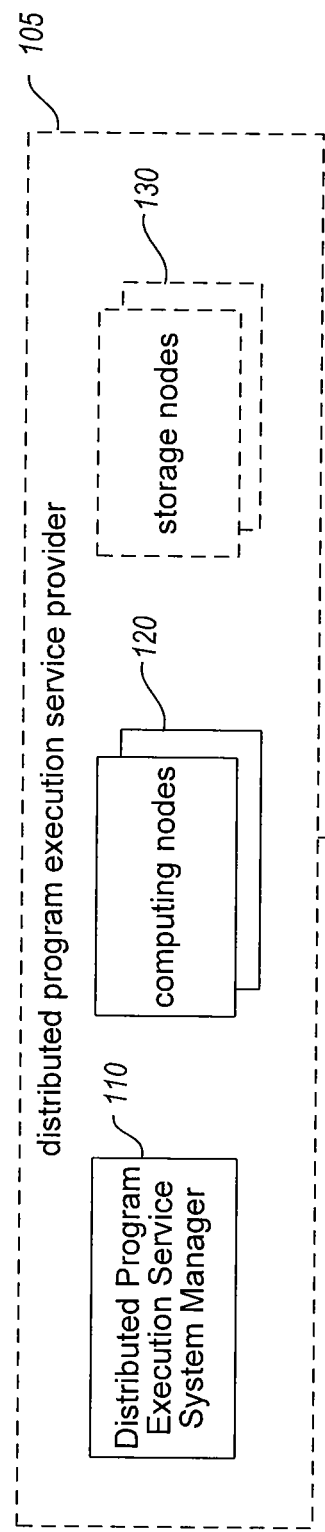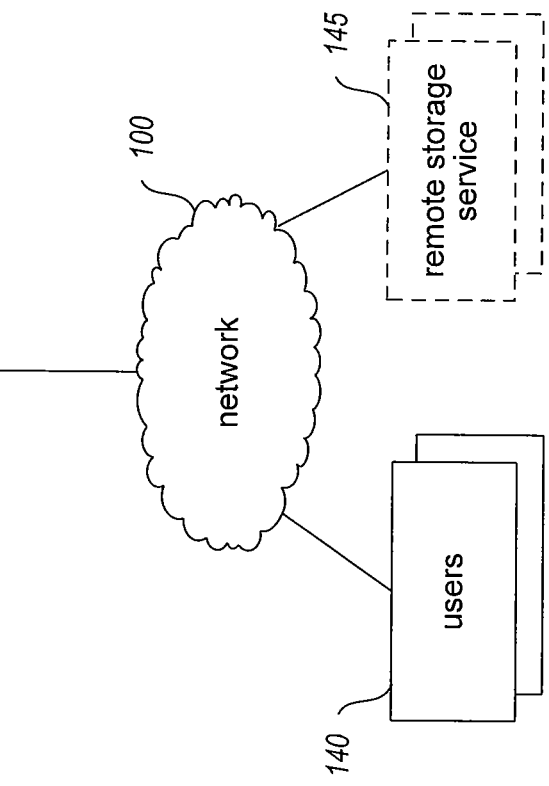
Fig. 1A

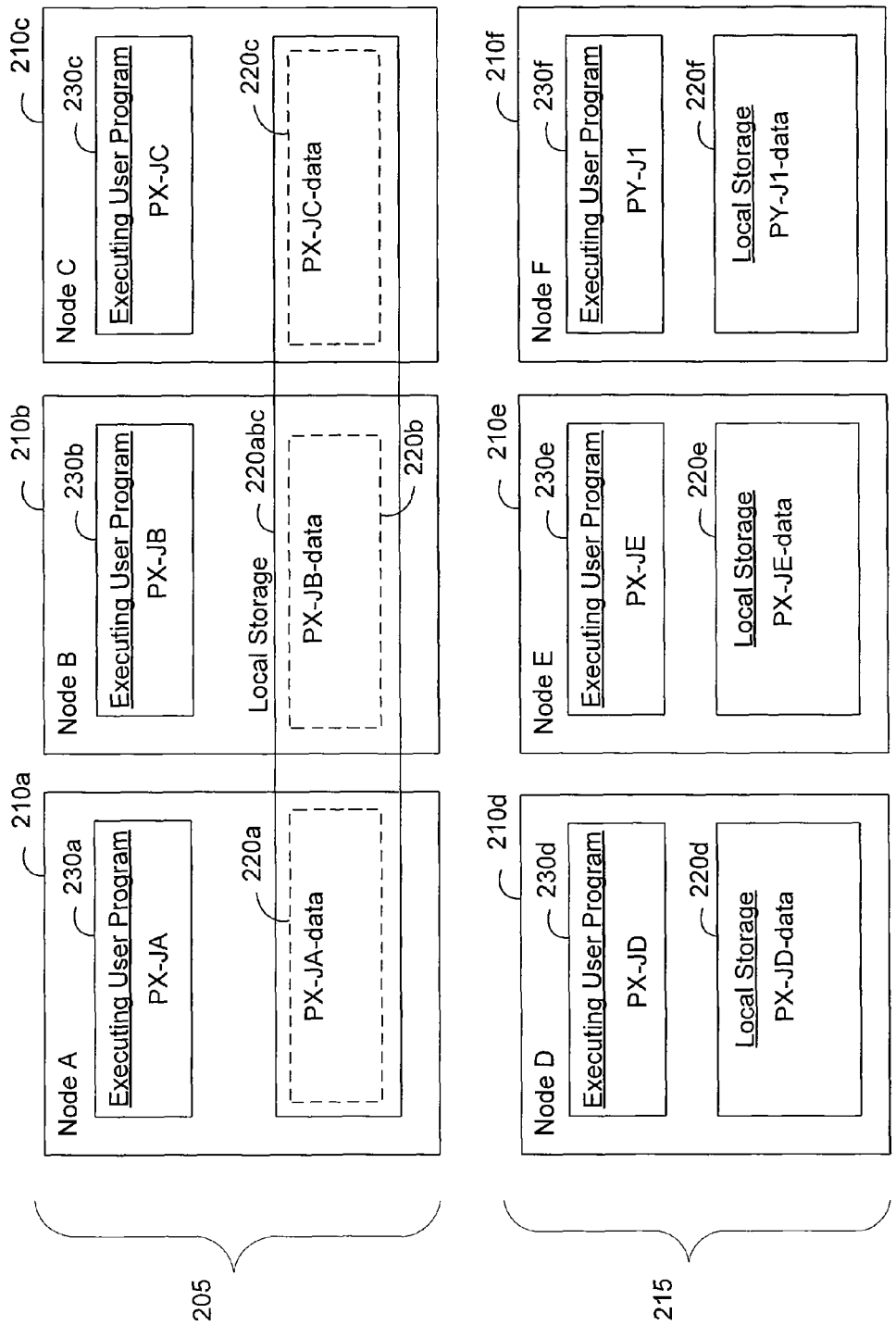

Example Status for Distributed Execution of Program X at Time 1

Program X Execution and Data State Information

| 260a Node | 260b Job | 260c Operation | 260d Input Data | 260e Output Data | 260f Status | 260g ... |
|---|---|---|---|---|---|---|
| A | PX-JA | A01 | D-A01 | D-A11 | completed | |
| A | PX-JA | A02 | D-A02 | D-A12 | in progress | |
| A | PX-JA | A03 | D-A11 | D-A21 | in progress | |
| A | PX-JA | A04 | D-A12 | D-A22 | queued | |
| ... | | | | | | |
| B | PX-JB | B01 | D-B01 | D-B11 | completed | |
| B | PX-JB | B02 | D-B02 | D-B12 | in progress | |
| B | PX-JB | B03 | D-B11, D-B12 | D-B21 | queued | |
| B | PX-JB | B04 | D-B12 | D-B22 | queued | |
| ... | | | | | | |
| C | PX-JC | C01 | D-C01 | D-C11 | completed | |
| C | PX-JC | C02 | D-C02 | D-C12 | in progress | |
| C | PX-JC | C03 | D-C11, D-C12 | D-C21 | queued | |
| C | PX-JC | C04 | D-C12 | D-C22 | queued | |
| ... | | | | | | |
| D | PX-JD | D01 | D-D01 | D-D11 | in progress | |
| D | PX-JD | D02 | D-D02 | D-D12 | in progress | |
| ... | | | | | | |

Fig. 2B

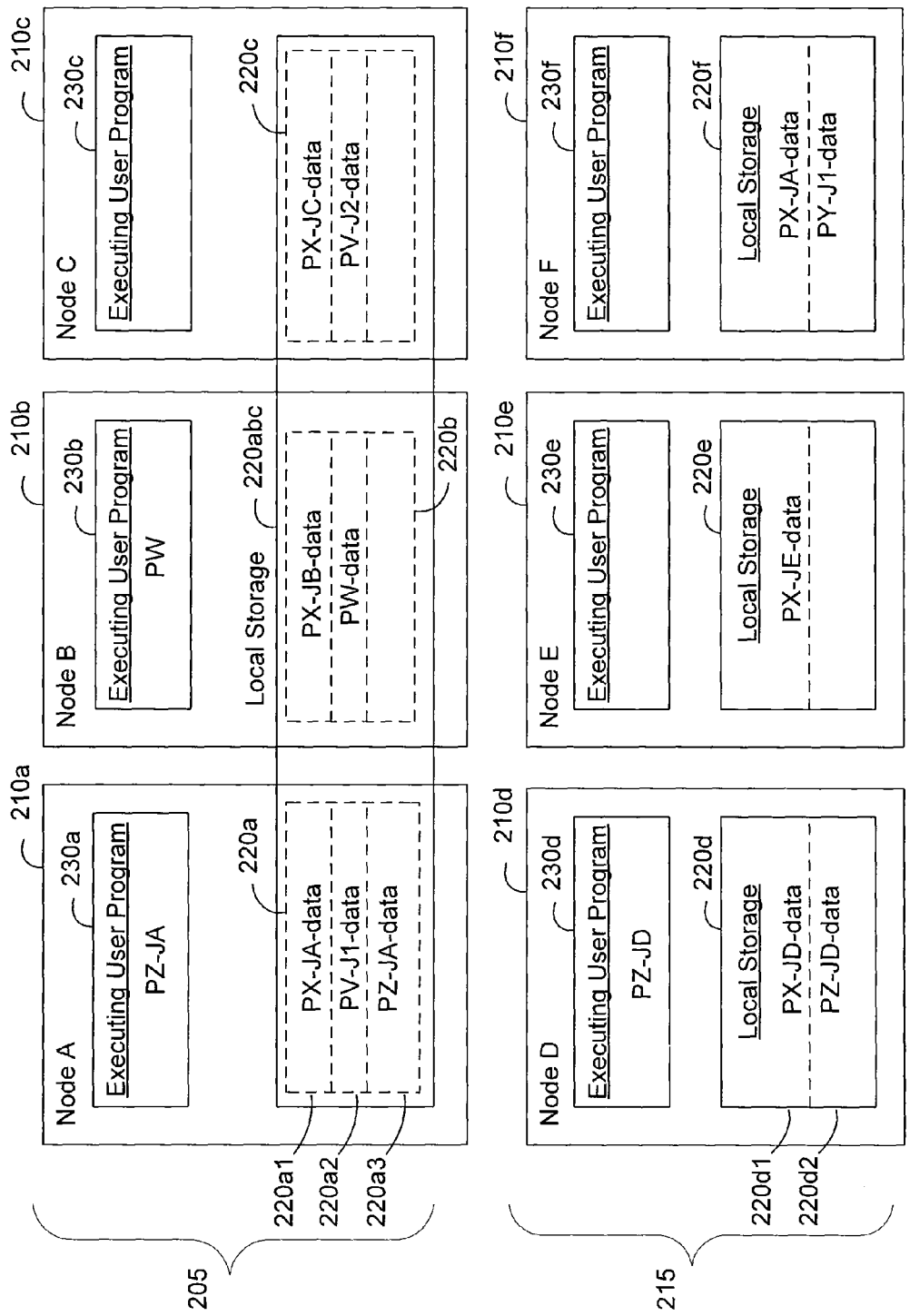

IDENTIFYING NODES ALREADY STORING INDICATED INPUT DATA TO PERFORM DISTRIBUTED EXECUTION OF AN INDICATED PROGRAM IN A NODE CLUSTER

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). Such groups of interconnected computing systems are increasingly useful for various reasons, including to support increasingly large software programs and input data sets that may be distributed across multiple computing systems.

Various approaches have been taken to providing groups of interconnected computing systems. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 1A and 1B are network diagrams illustrating example embodiments of use of a distributed program execution service by remote users.

FIGS. 2A-2C illustrate examples of managing distributed program execution on multiple computing nodes based on data storage location.

DETAILED DESCRIPTION

Figure 1B:
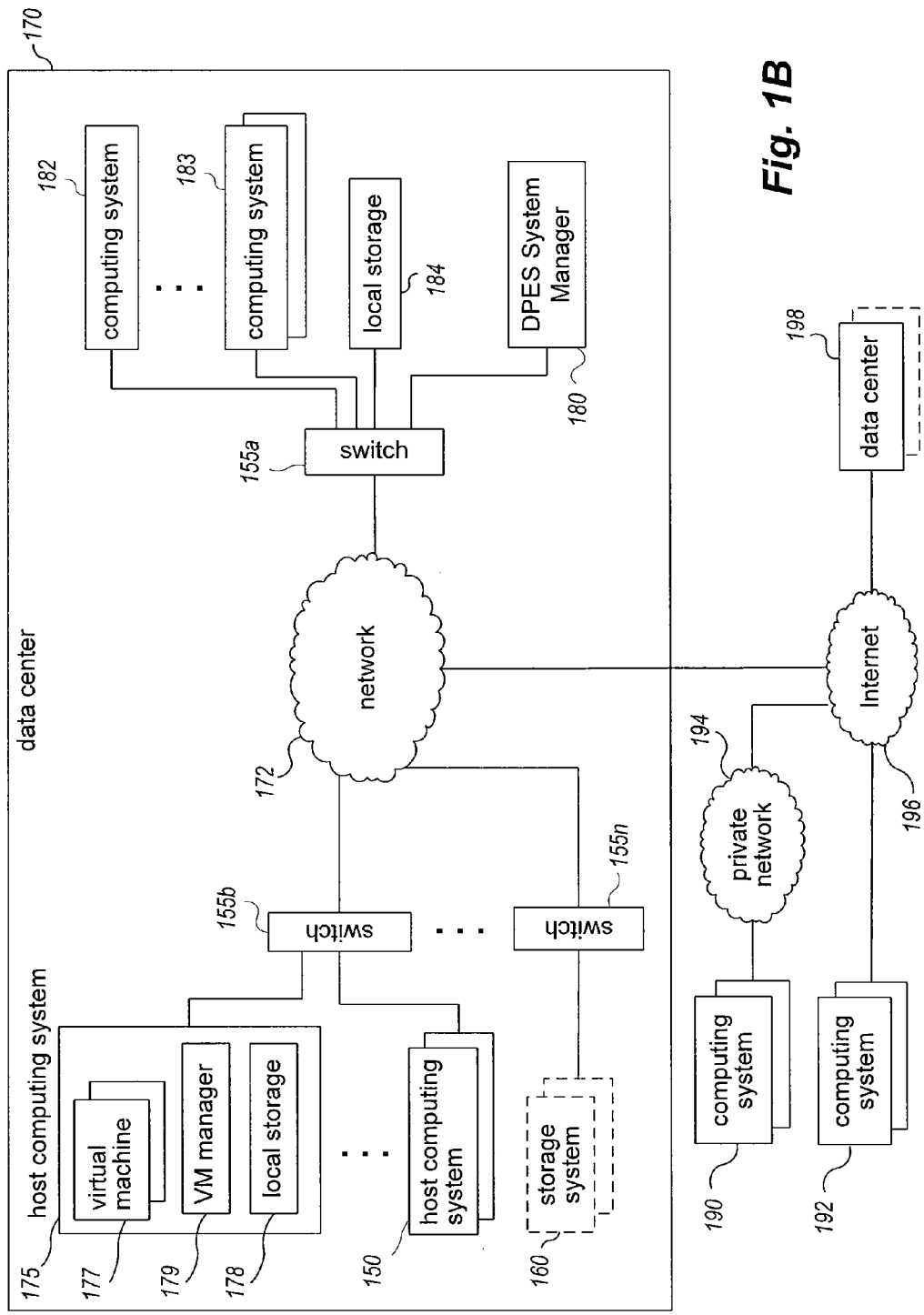

Techniques are described for managing execution of programs, such as for distributed execution of a program on multiple computing nodes. In at least some embodiments, the techniques for managing the execution of a particular program include selecting a cluster of computing nodes to use in the execution of the program in a manner that is based at least in part on data to be used during the execution of the program. For example, in at least some embodiments, the selection of the computing nodes for a cluster for a particular program may be performed in such a manner as to attempt to identify and use computing nodes that already locally store some or all of the input data that will be used by those computing nodes as part of the executing of that program on those nodes. Such techniques may provide benefits in a variety of situations, including, for example, when the transferring of data to and/or from computing nodes may impose large delays and/or monetary costs (e.g., if the size of the input dataset to be used by a program is large). Additional details related to selecting computing nodes to execute a program based at least in part on data to be used during the program execution and to otherwise managing the execution of programs are included below.

In addition, in at least some embodiments, some or all of the techniques may be automatically performed by embodiments of a Program Execution Service System Manager module. For example, in some embodiments, a Program Execution Service System Manager module may support an embodiment of a distributed program execution ("DPE") service for executing multiple programs in a distributed manner on behalf of multiple customers or other users of the service, as described in greater detail below. While some embodiments are discussed herein in which the techniques are used to facilitate distributed execution of a program on multiple computing nodes, it will be appreciated that the techniques may similarly be used in other embodiments to select a single computing node for use in executing a program or a portion of a program. Such a DPE service may in at least some embodiments provide various computing nodes (e.g., multiple physical computing systems and/or virtual machines that are hosted on one or more physical computing systems) with various computing resources (e.g., local memory, local storage, local CPU cycles, etc.) and other external computing resources (e.g., networks between computing nodes and to external computing systems, remote storage, etc.) for use in executing programs for users in a distributed manner. As described in greater detail below, the computing resources used to execute a particular program may include particular quantities of multiple types of computing resources (e.g., an aggregate amount of RAM or other memory of one or more physical computing systems that is used, such as by one or more computing nodes; an aggregate amount of network bandwidth capacity used on one or more networks, such as by one or more computing nodes; an aggregate amount of storage space used on one or more storage devices, such as by one or more computing nodes; etc.).

Data to be used in the execution of a program may be locally stored on computing nodes in various manners in various embodiments. For example, in some situations, a DPE service may provide a large number of computing nodes for use in executing programs, and a particular subset of multiple of those computing nodes may be selected for use as part of a cluster to execute a particular program. As part of initiating execution of that particular program, or in anticipation of later execution of that particular program, particular input data for that program may be obtained and copied to local storage on the multiple selected computing nodes, such as from one or more remote locations (e.g., a remote network-accessible storage service, one or more other remote storage devices, etc.), or as otherwise supplied by a user who initiates the execution of the program. As one example, the execution of some programs may be separated into multiple execution jobs, with each of the execution jobs using a distinct subset of the input data for the program—in such situations, one or more of the execution jobs may be assigned to each of the selected computing nodes of the cluster, and each of the cluster computing nodes may locally store the subset(s) of input data corresponding to the assigned execution job(s) for that computing node. In addition, as a program executes on multiple computing nodes, various data may be generated and stored locally on the multiple computing nodes, such as intermediate data generated during the execution and/or output data that represents the final results of the program execution—such generated data may also in some situations be stored remotely from the cluster computing nodes, such as in addition to locally stored copies of the data. Furthermore, in some embodiments, some or all of the input data and/or generated data for a program may be replicated in various manners (e.g., to enhance reliability and availability), such as to store a specified quantity of copies of each cluster computing node's data on other computing nodes (e.g., as part of a distributed file system, or instead in other manners). Additional details related to storing input data and generated data are included below.

Once data is locally stored on particular computing nodes, that data may be used for the execution of a program in various manners in various embodiments. As one example, in some situations, a particular set of input data may be used during multiple distinct program executions (e.g., by one program repeatedly, or by multiple programs), such as, for example, search index data that is repeatedly used to determine search results, a data warehouse that is repeatedly accessed to generate reports or otherwise analyze the included data (e.g., as part of data mining activities), etc. If so, during subsequent program executions after the first one, some or all of the same computing nodes used for the first program execution may be selected for a subsequent program execution, based at least in part on those computing nodes already locally storing the input data to be used for the subsequent program execution. In other situations, a first program may generate final results (or other data) that is used as input by a distinct second program, such as for multiple programs that are part of a workflow. If so, some or all of the same computing nodes used for the first program execution may be selected for the second program execution, based on those computing nodes storing the final results from the execution of the first program. In addition, the ongoing execution of a program on a cluster of multiple computing nodes that uses a particular set of input data may be temporarily suspended on some or all of those computing nodes in at least some embodiments, and may be later resumed using at least some of that same input data set (e.g., after one or more other programs have been executed on those computing nodes). If so, some or all of the same computing nodes used for the initial portion of the program execution before the temporary suspension may be selected for the resumed ongoing program execution, based on those computing nodes continuing to store the input data for use in the resumed execution. Data may be locally stored on computing nodes before corresponding program execution that uses that data in a variety of other situations as well.

In addition, particular computing nodes may be selected for use in the execution of a program based on data to be used for the execution in various manners in various embodiments. As previously noted, in some embodiments, computing nodes that locally store data for a particular program may be given a preference in selecting computing nodes for a cluster for that program's execution, such that those computing nodes are selected and used if they are currently available, but otherwise other computing nodes are selected and used (e.g., with the input data to be used for the program execution being copied to those other computing nodes). In other embodiments and situations, if computing nodes that locally store data for a particular program are not currently available, the execution of the program may be deferred, such as by waiting until those computing nodes are available (e.g., by reserving those computing nodes for use in the execution of the program once they become available, by periodically retrying the execution of the program to see if those computing nodes are available, etc.). In yet other embodiments and situations, other types of activities may be taken if computing nodes that locally store data for a particular program are not currently available, such as to take actions to make those computing nodes available (e.g., if those computing nodes are currently executing one or more programs for one or more other users, initiating a move of the ongoing execution of those other programs to other computing nodes and/or terminating or suspending the ongoing execution of those other programs)—such activities may be performed, for example, if the execution of the particular program has higher priority than the other current use of those computing nodes (e.g., based on a fee paid by a user corresponding to the execution of the particular program), if the execution of the particular program on those computing nodes provides benefits to the DPE service (e.g., if the execution of the particular program uses a particularly large amount of data, and the uses of the computing nodes with the locally stored data minimizes network traffic that would be involved in transferring the data to other computing nodes), etc.

Furthermore, in at least some embodiments, a particular cluster of multiple computing nodes that is used to execute a program on behalf of a user may be maintained by the user even after the program execution is completed (e.g., by continuing to locally store that user's program data, even if another user's program is executed; by preventing other users' programs from being executed, etc.), such as in exchange for a fee from the user, and so as to enable the user to later use that cluster of computing nodes for other program execution activities (e.g., by providing that user with exclusive use of those cluster computing nodes for a specified period of time; by providing that user with enhanced priority that provides benefits regarding such other program execution activities, such as to enable the user to be next-in-line to execute a program after a current program execution for another user is completed, or to enable the user to have access to the cluster computing nodes within a specified amount of time after the user makes a request, such as to enable another user's executing program on a cluster computing node to be moved or terminated; etc.).

In addition, program data may be locally stored on a computing node in various manners. As previously noted, in some situations a computing node may be a physical computing system, and the local storage for the computing node may include one or more storage devices (e.g., a hard disk, a magnetic tape drive, an optical disk drive, a flash memory drive, etc.) attached to the physical computing system. In other situations, a computing node may be one of multiple virtual machines hosted by a physical computing system, and the local storage for some or all of those computing nodes may be shared, such as to include one or more storage devices of the host physical computing system. In yet other situations, one or more computing nodes may use particular local storage in other manners, such as if the computing nodes have particular high-speed or other specialized access to one or more external storage devices (e.g., if multiple computing nodes are rack mounted as part of a shared rack, and one or more other rack mounted modules are storage devices shared by those computing nodes). In addition, in some embodiments, when multiple computing nodes share local storage and that local storage includes data for use in executing a particular program, any of those multiple computing nodes may be considered to be equivalent when selecting a computing node that locally stores that data. Thus, for example, if a first virtual machine computing node uses a first shared local storage device that stores a first group of input data as part of executing a first program, when a computing node is to be selected that locally stores that first group of input data (e.g., as part of executing the first program again, as part of resuming suspended execution of the first program, as part of executing another second program that also uses the first group of input data, etc.), the DPE service may select that first virtual machine computing node and/or one or more other virtual machine computing nodes (e.g., on a single host physical computing system) that share access to that first shared local storage device. It will be appreciated that other physical configurations may similarly provide access to local storage devices.

In addition, in some embodiments, at least some data may be stored remotely in various manners, and the remote data storage may be used in various manners in conjunction with locally stored data. For example, in some embodiments, remote block data storage volumes may be used in various manners by computing nodes, such as block data storage volumes provided by a non-local block data storage service that manages access of executing programs to the block data storage volumes. In some embodiments, such a block data storage service may have one or more groups of multiple co-located physical computing systems in or more geographic locations, such as in one or more geographically distributed data centers. Users of the DPE service (e.g., customers of the DPE service who pay fees to use the DPE service) may execute programs, and users of the block data storage service (e.g., customers of the block data storage service who pay fees to use the block data storage service, such as customers who are also customers of the DPE service) may use non-local block data storage volumes provided via the block data storage service, such as by temporarily attaching a particular block data storage volume to one or more computing nodes in such a manner that the computing nodes are able to access data using the block data storage volume (e.g., via read access and/or write access). As one example of using such block data storage volumes as part of the described techniques, in situations in which one or more computing nodes are locally storing data and that locally stored data is to have one or more replicated copies, one or more block data storage volumes may be used to hold a replicated copy—in such situations, if the one or more computing nodes are not available to be selected for a computing node cluster to execute a program that will use that locally stored data, those one or more block data storage volumes may be attached to one or more other computing nodes that may access the copy of that data for use by those other computing nodes. In other situations, one or more block data storage volumes may store a primary copy of particular data to be used during execution of a program, such that a computing node selected to participate in the program execution will typically attach and use those block data storage volumes (e.g., such that any node able to attach those block data storage volumes may be selected as part of a cluster for executing the program), but with one or more computing nodes having a locally stored copy of the data that may be used if the block data storage volume is not available. In some situations, a single organization may provide at least some of both DPE service capabilities and block data storage service capabilities (e.g., in an integrated manner, such as part of a single service), while in other embodiments the block data storage service may be provided in environments that do not include a DPE service (e.g., internally to a business or other organization to support operations of the organization). Additional details related to examples of use of a program execution service and/or a block data storage service are included below and in U.S. patent application Ser. No. 11/395,463, now U.S. Pat. No. 8,190,682, filed Mar. 31, 2006 and entitled "Managing Execution Of Programs By Multiple Computing Systems;" and in U.S. application Ser. No. 12/188,943, now U.S. Pat. No. 8,015,343, filed Aug. 8, 2008 and entitled "Providing Executing Programs With Reliable Access to Non-Local Block Data Storage;" each of which is incorporated herein by reference in its entirety.

FIG. 1A is a network diagram that illustrates an example of a DPE service that manages distributed execution of programs for multiple users. For illustrative purposes, some examples and embodiments are described below in which specific types of management of distributed program execution are provided in specific manners. These examples are provided for illustrative purposes and are simplified for the sake of brevity, and it will be appreciated that the inventive techniques may be used in a wide variety of other situations, some of which are described in greater detail below. For example, while particular examples of how to use locally stored data and other data as part of the distributed execution of programs are described, other types of distributed execution and of data usage may be used in other embodiments. In addition, while in some embodiments users initiate the execution of indicated programs in a distributed manner and/or modify the ongoing distributed execution of indicated programs, in other embodiments an embodiment of the DPE service may automatically initiate the execution and/or modification of such indicated programs and/or may determine to execute a program indicated by a user in a distributed manner (e.g., without knowledge of the user). Furthermore, in some embodiments at least some of the described techniques may be used with at least some programs that are not executed in a distributed manner, such as to configure execution of, initiate execution of, monitor execution of, and/or modify execution of such a non-distributed program.

In the example of FIG. 1A, a number of users 140 are interacting over a network 100 with an illustrated embodiment of a Distributed Program Execution Service System Manager ("DPE Service SM" or "DPESSM") module 110 to initiate distributed execution of programs on one or more computing nodes 120 that are available for executing programs of the users, such as a DPESSM module 110 that provides some or all of the functionality of a particular embodiment of a DPE service (not shown). The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the DPESSM module 110 and the computing nodes 120 are provided by a DPE service provider 105 as part of a DPE service, as well as one or more optional other storage nodes 130, and the DPESSM module 110 may execute on one or more other computing systems (not shown).

In some embodiments, the illustrated computing nodes 120 are provided by the DPE service provider 105 for distributed execution of programs on behalf of the users, and may include multiple physical computing systems and/or multiple virtual machines that are hosted on one or more physical computing systems (e.g., as is described in more detail with respect to FIG. 1B for one example embodiment). Each of the computing nodes 120 has some amount of computing resources available for executing one or more programs, such as may be measured, for example, by a combination of one or more of processing capacity (e.g., number and/or size of processing units), memory capacity, local storage capacity, disk I/O ("input/output") capacity, etc., and other components (not shown) provided by the DPE service may provide other computing resources (e.g., network bandwidth capacity of one or more networks, additional non-local storage capacity of network storage devices or other storage remote from particular computing nodes, etc.). In some embodiments, the DPE service provider 105 may provide preconfigured computing nodes, with each preconfigured computing node having similar and/or equivalent amounts of computing resources available for executing programs on behalf of users, while in other embodiments, the DPE service provider 105 may provide a selection of various different computing nodes, such as with different types or groups of computing nodes having varying amounts and/or types of computing resources (e.g., size, speed and/or type of processing units; number of processing units; amount of memory and/or local storage; platform configuration, such as 32-bit or 64-bit; etc.).

In the illustrated embodiment, the various users 140 may interact with the DPESSM module 110 to make requests and specify various information. In various embodiments, such user requests and specifications may be made at various times, such as when a user registers to use services of the DPE service and/or at later times. For example, the DPESSM module 110 may provide subscription and/or registration services to one or more users, such that a user may specify information related to one or more programs to execute on behalf of the user (e.g., programs, source code, input data, network addressable locations of one or more programs and/or input data, etc.), account information (e.g., user name, billing information, etc.), terms of use, etc. In some embodiments, after a user interacts with the DPESSM module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the DPESSM module 110 may be provided to perform various operations related to subscription and/or registration services of the DPE service.

In addition, the users may interact with the DPESSM module 110 to initiate and configure execution of programs in various ways in various embodiments, such as by specifying a quantity and/or type of computing nodes for execution of programs, a minimum and/or maximum quantity of computing nodes to use, a preferred execution time and/or period of execution, an expiration time for the program execution request, a selection of one of multiple priorities for the execution (e.g., with associated fees that increase with increased priority), etc. Furthermore, in some embodiments, a user may interact with the DPESSM module 110 to request immediate execution of one or more programs on a specified number of computing nodes and/or to schedule such execution at one or more future times, such that the DPESSM module 110 may initiate the requested execution on the specified number of computing nodes at a specified time or when one or more specified criteria are satisfied (e.g., when it is determined that a specified number of computing nodes are available, when it is determined that computing nodes with appropriate locally stored data are available, etc.).

In this illustrated embodiment, the DPE service provides a variety of functionality for managing distributed execution of programs for multiple users on the computing nodes 120. For example, a particular user may use a GUI ("graphical user interface") or API ("application programming interface") provided by the module 110 to submit a request for execution of an indicated program using indicated input data, optionally along with a variety of other types of configuration information. After the request for execution of the program is received, the DPESSM module 110 may select which of the available computing nodes 120 to use for the requested execution in various ways. For example, in some embodiments, the module 110 may simply select an appropriate quantity of computing nodes from any of the available computing nodes with sufficient resources, such as, for example, by randomly selecting from a pool of available computing nodes. In other embodiments, one or more specific computing nodes may be selected on the basis of one or more other factors, such as local storage of some or all of the indicated input data and/or, for example, a predicted length of and/or likelihood of continued availability of the one or more computing nodes, a physical proximity of the one or more specific computing nodes to one or more other computing nodes, a geographic location of the one or more specific computing nodes and/or of one or more other computing nodes, etc. In addition, after the request is received, the module 110 may further determine how to separate the indicated program into multiple execution jobs to be executed on the multiple selected computing nodes, such as by using information supplied by the user and/or in an automatic manner based on previously obtained information about the design of the indicated program. Similarly, in at least some embodiments and situations, the module 110 may determine how to separate the indicated input data into multiple subsets for use by the multiple execution jobs. For example, in some situations, each execution job may include executing a full copy of the indicated program but on a particular subset of input data, while the other execution jobs similarly execute the full program copy functionality on other input data subsets. Alternatively, in some situations, various execution jobs may perform different functions on a single common set of input data.

As the execution jobs execute on the various computing nodes, the execution jobs store various data locally on the computing nodes in at least some embodiments. In addition, the DPE service and/or another service (e.g., a block data storage service) may optionally provide one or more storage nodes 130 that are used to store data related to program execution and/or for other purposes. As discussed in greater detail elsewhere, such data stored on the storage nodes 130 may include, for example, input data, intermediate data generated by the partial execution of various execution jobs for various programs, and/or output data that is generated by completed execution jobs.

In addition, as the execution jobs of a program execute in a distributed manner on the various computing nodes of a cluster for that program, the DPE service may automatically perform various actions to dynamically monitor and/or modify the ongoing distributed execution of the program. For example, as discussed in greater detail elsewhere, the dynamic modifying of the ongoing distributed execution of the program on the multiple computing nodes of the cluster may include optionally performing various types of changes in certain situations, and the DPESSM module 110 may select which types of actions to pursue in which situations (e.g., based on predefined criteria specified generally for the DPE service, or specified specifically for the program being executed or other user on whose behalf the program is being executed).

Furthermore, as discussed in greater detail elsewhere, in some embodiments the module 110 may provide indications to cause intermediate data from partial execution of one or more execution jobs to be persistently stored before the partial execution of the execution job is temporarily terminated or otherwise suspended. Such intermediate state data for the partial execution may be stored in various manners remotely from the computing node on which the partial execution occurred, such as by copying such intermediate data to one or more of the optional storage nodes 130 and/or by using one or more optional remote storage services 145 that are accessible over the network 100, and/or may be maintained locally in storage on the computing node while the execution is temporarily suspended. In some embodiments, the module 110 coordinates the storage of the intermediate data from the computing node to the remote persistent storage location, such as by using information that the module 110 tracks about the intermediate state of the partial execution, while in other embodiments the activities in performing the persistent storage of the intermediate data may instead be performed by management software executing on the computing node to locally manage the execution of the execution job. Alternatively, if a particular executing execution job is able to store its own intermediate execution state, the module 110 may instead notify the execution job to perform its own intermediate execution state storage actions before shutting down its own execution. After the intermediate data from partial execution of an execution job has been persistently stored (whether locally and/or remotely) and the partial execution has been terminated, the partial execution may be resumed from that suspended intermediate state at a later time, such as substantially immediately (e.g., if the execution of the execution job is being moved from a first computing node to a second computing node, as quickly as the intermediate data may be stored and copied), or instead after a longer period of time (e.g., at a later scheduled time, a later time when one or more specified criteria are satisfied, etc.). At the time of execution resumption, the stored intermediate data may be retrieved from the persistent storage location, and locally stored on or otherwise made available to the computing node on which the execution job execution is to resume. In addition, the partial execution of the execution job may be resumed in various manners, such as by indicating to the execution job not to perform a subset of operations that were previously completed (e.g., if the execution job supports such functionality), by modifying the execution job to only perform a subset of the operations that were not previously completed, etc. Additional details related to the suspension and resumption of execution of execution jobs are described elsewhere.

FIG. 1B illustrates an embodiment in which a DPE service may be provided using one or more data centers that include multiple physical computing systems. In particular, FIG. 1B is a network diagram illustrating an example embodiment in which a DPESSM module 180 of a DPE service manages distributed execution of programs on behalf of users at an example data center 170. The example data center 170 is connected to the Internet 196 external to the data center 170, which in this example provides access to various external computing systems, such as computing systems 190 via private network 194 and other directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the DPE service in at least some embodiments. For example, the distributed execution of a particular program may include simultaneous and/or sequential execution using computing nodes at multiple data centers or other distinct geographical locations, including to move execution of an execution job from a computing node at one geographical location to a computing node at another geographical location.

The example data center 170 includes a number of physical host computing systems 175 and 150, physical computing systems 182 and 183, local storage device/system 184, optional storage systems 160, and a DPESSM module 180 of an embodiment of the DPE service. In this example, host computing systems 175 and 150 each provide multiple virtual machines and corresponding local storage, with host computing system 175 illustrated in detail to show multiple virtual machines 177, a virtual machine ("VM") manager module 179 to manage those virtual machines (e.g., a hypervisor or other virtual machine monitor), and one or more storage devices 178 local to the host computing system 175. Each of the host computing systems 150 may have similar virtual machines, VM manager modules and local storage devices to that of host computing system 175, although those details are not illustrated here for the sake of brevity, and some or all of the computing systems 182 and 183 may similarly have one or more such virtual machines, VM manager modules, and/or local storage devices (not shown). In this example, the computing systems 182 and 183 share access to one or more local storage devices 184 external to those computing systems, such as one or more local storage devices 184 that are part of a rack (not shown) to which the computing systems 182 and 183 are mounted. In other embodiments, local storage devices external to the computing systems may not be used for local storage, such as if each of the computing systems 175, 150, 182 and 183 has one or more attached local storage devices. The example data center 170 further includes an internal network 172 that may include multiple networking devices, such as switches 155 and/or other networking devices (e.g., edge routers and core routers) that are not shown, with computing systems 175, 150, 183 and 182, storage systems 160, local storage device 184, and the DPESSM module 180 connected to the internal network 172.

The virtual machines 177 and other virtual machines (not illustrated) may each act as a computing node for use by the DPE service, and a VM manager module on a host computing system provides one example of a type of module that the DPE service may use to manage the host computing system (e.g., by obtaining status information about one or more of the virtual machine computing nodes hosted by that host computing system, by throttling computing resources used by one or more of the hosted virtual machine computing nodes, by changing computing resources allocated to or otherwise available to one or more of the hosted virtual machine computing nodes, etc.). Alternatively, in other embodiments, some or all of the physical host computing systems at the data center may not provide any virtual machines, such as to instead act as a computing node that directly executes one or more programs on behalf of end-user customers of the DPE service, and such other host computing systems may similarly execute a module of the DPE service that manages distributed program execution in which that host computing system participates. In addition, in some embodiments, the physical computing systems 175, 150, 183 and/or 182 may each include management software (e.g., a management module of the DPE service, such as part of or distinct from the VM manager modules) to manage the execution of execution jobs on the computing systems. Furthermore, in some embodiments, various of the computing systems 175, 150, 183 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, one or more such factors may further be used as constraints and/or preferences regarding which computing systems to select for executing particular programs, such as in addition to local storage of appropriate data. The optional storage systems 160 and/or local storage device(s) 184 may also have various forms, such as computing systems with attached storage (e.g., that may also be used as computing nodes at times), network storage devices that are not used as computing nodes, etc.

The illustrated DPESSM module 180 performs at least some of the described techniques in order to manage distributed execution of programs using the computing systems 175, 150, 183 and 182, and to optionally persistently store at least some data on storage systems 160. For example, the DPESSM module 180 may provide a GUI or other functionality that enables remote users to configure distributed program execution and/or to track and optionally modify ongoing distributed program execution, such as for users (not shown) of computing systems 190 or 192 or at one of the other data centers 198. When a particular computing node or system is selected to execute one or more execution jobs of a program, the DPESSM module 180 may in some embodiments initiate execution of the execution jobs by interacting with a VM manager module or other manager module that controls execution of programs for that selected computing node/system, or may alternatively directly execute the execution jobs on the selected computing node/system. The DPESSM module 180 may further in some embodiments take various actions to move data to computing nodes (e.g., from remote locations), from computing nodes (e.g., when local storage of the data is to not longer be maintained), and/or between computing nodes (e.g., as part of copying locally stored data from an unavailable computing node to another computing node that is available), as well as provide other functionality (e.g., to dynamically monitor and/or modify the ongoing distributed execution of various programs executing on the computing nodes of the data center 170 that are used by the DPE service). In addition, some of the computing systems 190 or 192 or at one of the other data centers 198 may be used to provide one or more network-accessible remote storage services (not shown) that are accessible by the DPE service and used to persistently store at least some intermediate data or other information.

It will be appreciated that the data center of FIG. 1B is provided for illustrative purposes only, and that an embodiment of a DPE service and other software execution services may be provided in other manners in other embodiments. For example, DPESSM module 180 may instead be provided using one or more other computing systems external to the data center 170, such as computing systems 190, 192 or at a data center 198. In addition, in at least some embodiments, the programs for which distributed execution is provided may include executable software images, such as virtual machine images that are bootable or otherwise loadable on one or more virtual machine computing nodes, and that each may include operating system software, software for one or more application programs, and/or configuration information, etc. At least some such programs may be stored by the DPE service and/or by users on the storage systems 160 and/or using a remote storage service, and if so are retrieved by or supplied to the DPE service when they are to be executed on behalf of a user or as otherwise initiated. Furthermore, while only a limited number of devices are illustrated in this example, it will be appreciated that in a typical arrangement, data center 170 may include hundreds or thousands of host computing systems such as those illustrated here, organized into a large number of distinct physical networks with a large number of networking devices (e.g., in a hierarchical manner).

FIGS. 2A-2C illustrate examples of selecting computing nodes for use in distributed execution of an indicated program based on local storage of program data. In particular, FIG. 2A illustrates several example computing nodes 210 that are part of a cluster participating in the ongoing distributed execution of an example program, Program X, at a particular time, Time 1. In the example of FIG. 2A, the cluster of computing nodes 230 participating in the distributed execution of Program X include example computing nodes Node A 210*a*, Node B 210*b*, Node C 210*c*, Node D 210*d*, and Node E 210*e*, as discussed in greater detail with respect to FIG. 2B, and one or more other computing nodes (not shown) may also be part of the cluster and acting as master computing nodes to control various actions of the cluster computing nodes 210. In addition, in this example, another computing node Node F 210*f* is currently executing part of another example program, that being Program Y.

In the example of FIG. 2A, each of the computing nodes 210 has associated local storage 220 for storing program data, and shows information 230 regarding the program being currently executed. For example, Node D shows information 230*d* that reflects that execution job PX-JD of Program X is currently being executed, and the local storage 220*d* of Node D stores program data PX-JD-data being used by the PX-JD execution job. In a similar manner, Node E shows information 230*e* that reflects that execution job PX-JE of Program X is currently being executed, and the local storage 220*e* of Node E stores program data PX-JE-data being used by the PX-JE execution job. The local storage 220*d* and 220*e* of computing nodes Node D and Node E, respectively, may be, for example, local storage devices attached to those computing nodes, such as if Nodes D, E and F of group 215 are each a distinct physical computing system. Conversely, in this example, Nodes A, B and C of group 205 share local storage 220*abc*, such as if Nodes A, B and C are each a virtual machine computing node of a single physical computing system (not shown) and the local storage 220*abc* is a local storage device attached to that single physical computing system. In this example, the shared local storage 220*abc* is illustrated as being multiple logical storage partitions 220*a*, 220*b* and 220*c* for Nodes A, B and C, respectively, although in some embodiments any of the nodes of group 205 may be able to access any of the logical storage partitions of the local storage 220*abc*, while in other embodiments the logical storage partitions may each only be accessible from its corresponding node. In this example, in a manner similar to that of Nodes D and E, information 230*a*, 230*b* and 230*c* of Nodes A, B, and C, respectively, reflects that execution jobs PX-JA, PX-JB and PX-JC of Program X are currently being executed on Nodes A, B and C, respectively. In addition, the local storage partitions 220*a*, 220*b*, and 220*c* of Nodes A, B, and C, respectively, store program data PX-JA-data being used by the PX-JA execution job, program data PX-JB-data being used by the PX-JB execution job, and program data PX-JC-data being used by the PX-JC execution job. Thus, if the cluster of computing nodes executing Program X currently includes only the illustrated 5 computing nodes Nodes A-E, then the program data being currently used for the program execution is the aggregation of program data subsets PX-JA-data, PX-JB-data, PX-JC-data, PX-JD-data and PX-JE-data, and the current execution of Program X includes execution jobs PX-JA, PX-JB, PX-JC, PX-JD and PX-JE.

FIG. 2B continues the example of FIG. 2A, and illustrates status information 260 that provides additional details related to the example distributed execution Program X at Time 1 as previously discussed with respect to FIG. 2A. While not illustrated here, in some embodiments such status information 260 may be available to a user who is associated with Program X, such as for display to the user as part of a GUI of the DPE service that optionally includes various user-selectable controls. While not illustrated in this example, in some embodiments and situations, different users or other entities may be involved in different parts of the distributed execution of a program, such as to have a first user initiate distributed execution of a program, a second user initiate a first suspension of execution of that program, a third user initiate a first resumed execution of that program, etc. Such two or more different users may, for example, represent a single entity, not represent the same entity but be affiliated in one or more other manners (e.g., based on working together), have authorization that has been granted to perform specified actions for other users, etc.

In particular, in this example, each line or entry in the information 260 corresponds to the performance of a particular operation for a particular execution job on a particular computing node, with information being tracked that in this example includes an identification 260*a* of the computing node, of the execution job 260*b*, of the operation 260*c*, of the status of performance 260*f* of the operation, of input data 260*d* to be used by the operation, of output data 260*e* to be produced by the performance of the operation, and optionally of various other information 260*g*. Such other status information may include, for example, information about dependencies or other inter-relationships between operations (e.g., operation B cannot be executed until after operation A is completed, operations C and D are to be executed simultaneously, etc.), information about expected completion of performance of an operation being performed (e.g., an expected completion time, an expected amount of time until completion, a percentage completion of an operation, a percentage of the operation that remains to be performed, etc.), information about expected initiation of performance of operations that are not yet being performed, etc. Various other types of information may similarly be displayed for Program X, such as information about one or more master nodes that control execution of the execution jobs on the various multiple computing nodes and that store various status information for the distributed execution.

In this example, execution job PX-JA on Node A includes operations to be performed that include at least example operations A01, A02, A03, and A04, with the first four entries in the status information 260 corresponding to these operations for that execution job and computing node. In particular, operation A01 has already been completed, and during its performance it used input data D-A01 and produced output data D-A11. Operation A03 uses that output data D-A11 as input data, and is in progress of being performed to produce output data D-A21, but that output data has not yet been completed. Similarly, operation A02 is in progress and is using input data D-A02 to eventually produce output data D-A12. Because operation A04 uses that output data D-A12 as input data, operation A04 is queued and ready to be executed when its input data and Node A are available to perform it, but the performance of operation A04 has not yet begun. Thus, the program data PX-JA-data on local storage partition 220*a* of FIG. 2A includes at least input data D-A02 and D-A11 that are currently in use, and may further include input data D-A01 that was previously used and/or partial versions of output data D-A12 and D-A21 that are being generated. Similar status information is illustrated for other computing nodes, execution jobs and operations.

FIG. 2C continues the example of FIGS. 2A and 2B, and in particular illustrates an updated version of the computing nodes 210 of FIG. 2A at a later time Time 2. In this example, at some time after Time 1 and before Time 2, the distributed execution of Program X on Nodes A-E has stopped, such as if the distributed execution has completed, or if a partial distributed execution has been temporarily suspended. At Time 2, Nodes C, E and F are not currently executing any programs and are thus available for program execution, while Nodes A and D are executing two execution jobs of example Program Z, and Node B is executing a non-distributed Program W.

In addition, the local storage for Nodes A, B, C, D and F has been updated to reflect additional program data that has been stored on those computing nodes based on activities that have occurred between Time 1 and Time 2, while the local storage of Node E continues to include PX-JE-data program data for Program X (optionally updated with respect to the version of the PX-JE-data program data that was stored at Time 1, such as if the PX-JE execution job on Node E generated and stored additional program data before the execution stopped). In particular, in this example, local storage partition 220*a* of Node A continues to store program data PX-JA-data 220*a*1 for Program X, newly stores program data PZ-JA-data 220*a*3 for the PZ-JA execution job that is currently being executed, and also newly stores program data PV-J1-data 220*a*2 (e.g., for an execution job PV-J1 of Program V that was executed and completed between Time 1 and Time 2, to preload program data for execution job PV-J1 of Program V that has not yet been executed, to store a replicated copy of program data PV-J1-data for execution job PV-J1 of Program V that is currently or previously executed on a computing node other than Node A, etc.). In a manner similar to Node A, the local storage for Nodes B and D continue to include program data for Program X as well as new program data for the program being currently executed, and Node C continues to include program data for Program X as well as new program data for a program previously executed on Node C. In addition, as discussed in greater detail elsewhere, in some embodiments some or all program data for some or all programs may be replicated so as to have one or more copies, and Node F illustrates a replicated copy of program data PX-JA-data for Program X that is the same as the PX-JA-data 220*a*1 of Node A. Furthermore, in this example, the three sets of program data on logical storage partition 220*a* fill or substantially fill the local storage partition, such that other additional program data cannot be stored on the local storage partition 220*a* unless one or more of the other groups of program data 220*a*1, 220*a*2 and 220*a*3 are deleted, while the local storage for Nodes B-F continues to include available storage space for additional storage data.

In the example of FIG. 2C, a request is made to initiate execution of a program at Time 2 that uses the previously discussed program data for Program X, such as to resume temporarily suspended execution of Program X, to execute a different program that uses the same input data as Program X, to execute a different program that uses output data from Program X as input data, etc. Accordingly, the DPE service attempts to select computing nodes for the new program execution to be initiated at Time 2. In the illustrated embodiment, the DPE service first attempts to use the same 5 computing nodes Nodes A-E that were used in the cluster for the previous Program X execution, based on their local storage of the aggregate program data for Program X. In this example, Nodes C and E are identified as candidates for potential selection based on being currently available for the new program execution and locally storing the PX-JC-data and PX-JE-data subsets of the Program X program data. However, Nodes A, B and D are not identified as candidates for potential selection on the same basis in this example, based on each of those computing nodes being currently unavailable at Time 2 (based on an assumption in this example that each computing node is only able to execute one or more execution jobs for a single program at a time, but may be able to store program data subsets for multiple programs). The DPE service in this example further identifies Node F as a candidate for potential selection based on being currently available for the new program execution and locally storing the replication copy of the PX-JA-data program data.

However, computing nodes have not yet been identified corresponding to the PX-JB-data and PX-JD-data subsets of the Program X program data, since Nodes B and D that locally store those program data subsets are not currently available. As discussed in greater detail elsewhere, the DPE service may take various actions in such a situation, including one or more of the following: delaying the new program execution until Nodes B and D are available (or until one or more other computing nodes that locally store the PX-JB-data and PX-JD-data subsets are available, such as one or more other computing nodes that store replicated copies of those program data subsets), with identified Nodes C, E and F being optionally reserved until that time so that they continue to be available, and/or with Nodes B and D being optionally reserved for the new program execution once the Program Z execution stops; selecting one or more other computing nodes to use in place of Nodes B and D, and initiating local storage of the PX-JB-data and PX-JD-data subsets of Program X on the selected one or more other computing nodes; taking actions to make Nodes B and/or D available at or near Time 2 for the new program execution, such as by suspending or terminating the execution of Program Z (or of execution jobs PZ-JA and PZ-JD of Program Z), by moving the execution of execution jobs PZ-JA and PZ-JD of Program Z to one or more other computing nodes, etc.; indicating that the new program execution is not available at Time 2 based on the lack of locally stored PX-JB-data and PX-JD-data subsets, such as to optionally try again at a later time; etc. It will be appreciated that other types of actions may similarly be taken as well, as discussed in greater detail elsewhere.

In addition, as previously noted, the DPE service may provide various other types of functionality to perform distributed execution of programs for users in some embodiments. For example, in at least some embodiments, the functionality may include managing the initial configuration to be used in the execution of an indicated program, including using configuration parameters such as a quantity of computing nodes and/or other measures of computing resources to be used for the executing. The distributed execution of a program may be initiated and configured in various manners in various embodiments, such as by a user interacting with an embodiment of a DPE service to request the execution of the program in a manner specified by the user. For example, the DPE service may provide a GUI that a remote user interactively uses to make the execution request (e.g., a Web-based GUI with which a user interacts via a client application, such as a Web browser, executing on a client device of the user), and/or the DPE service may provide one or more APIs that enable a computing device and program of the user to programmatically interact with the DPE service to make the request (e.g., one or more APIs that are also used by the provided GUI). The user may specify various information as part of such a request, such as an indication of the program to execute (e.g., by supplying an executable copy of the program, by indicating a program previously registered by the user with the DPE service, by indicating a program made available by the DPE service for use by users, etc.), and an indication of input data for use by the executing program (e.g., by supplying the input data or by indicating an accessible location from which the input data may be obtained). An executable copy of a program may be supplied in various manners and formats, such as, for example, a Java ARchive ("JAR") file.

In addition, the user may further specify other configuration parameters for the distributed program execution in at least some embodiments, such as one or more of the following: an indication of a quantity of computing nodes to use for the requested execution; an indication of a type of computing node to use for the requested execution (e.g., if the DPE service provides different types of computing nodes with different capabilities, such as different amounts of memory, storage and/or processing power) and/or one or more other execution criteria to use in performing the requested execution (e.g., a user-specified QoS, or Quality of Service, level associated with the requested execution; an indication of a time by which the requested execution is to be completed; etc.); information about a location or layout of some or all of the computing nodes to use for the requested execution, such as relative to each other, to indicated data and/or to some other location (e.g., to be within a specified degree of geographical or network distance), or instead in an absolute manner (e.g., at a particular data center or other geographical location, within the boundaries of a country or other indicated geographical area, etc.); access information for use in communicating with one or more of the computing nodes, such as an SSH ("secure shell") key; configuration information for use in configuring a particular instance of the program for use with the requested execution; an indication of multiple execution jobs into which the indicated program execution is to be separated for parallel or other distributed execution, or instead an indication of how the DPE service is to automatically determine those multiple execution jobs (e.g., if the indicated program is designed to be separable in a defined manner into distinct execution jobs, such as based on an execution methodology used by or other design of the program); etc. More generally, in at least some embodiments, a user may be able to specify other more general high-level execution criteria (e.g., to complete execution as cheaply as possible within some indicated time period, to complete execution as quickly as possible with a specified maximum associated fee, to complete execution in a manner that attempts to optimize one or more other types of indicated factors, etc.), and the DPE service may automatically determine to provide preferred or otherwise appropriate execution configuration parameters to use to satisfy those execution criteria, as discussed in greater detail below.

Furthermore, in at least some embodiments, the DPE service may further automatically determine some or all such configuration parameters for the distributed execution of a particular program, such as for use in warning a user if user-specified configuration parameters are sub-optimal or otherwise problematic (e.g., are insufficient to complete the execution by a desired time indicated by the user), or for otherwise recommending configuration parameters to the user. The automatic determining of such configuration parameters may be performed in various manners in various embodiments, such as based on the DPE service monitoring and assessing previous related program executions for various users that use differing configuration parameters (e.g., execution of the same program, such as for a program provided by the DPE service for use by users; execution of other programs of the same or similar type, such as that use the same design or execution methodology; etc.) in order to identify one or more preferred sets of configuration parameters for a particular program or particular program type. Additional details related to configuring the distributed execution of a program are included below.

The ongoing distributed execution of one or more programs for a user may also be tracked and modified in various manners in various embodiments, such as by a user interacting with an embodiment of a DPE service to modify ongoing distributed program execution in a manner specified by the user. For example, the DPE service may provide a GUI that a remote user may interactively use to view status information related to ongoing distributed program execution (e.g., based on dynamic monitoring of the ongoing distributed program execution that is performed by the DPE service, based on status information gathered by a master node that is controlling the program execution or otherwise provided by the program, etc.) and/or to make a distributed program execution modification request (whether the same GUI as used for configuring program execution or instead a distinct GUI), and/or may provide one or more APIs that enable a computing device and program of the user to programmatically interact with the DPE service to obtain such tracked information and make such modification requests (e.g., one or more APIs that are also used by the provided GUI for use in modifying execution). The types of distributed program execution modifications that may be initiated by a user may vary in various embodiments and situations, including to modify various previously specified configuration parameters for an distributed program execution (e.g., a quantity of computing nodes to use for the ongoing distributed execution), to suspend and optionally later resume some or all of the ongoing distributed execution, etc. Additional details related to modifying the ongoing distributed execution of a program are included below.

In addition, in at least some embodiments, the techniques for managing the distributed execution of a particular program include dynamically monitoring the ongoing distributed execution of a program on a cluster of multiple computing nodes, and dynamically modifying the distributed program execution in various manners based on the monitoring. The dynamic monitoring may include, for example, determining the status of execution of the program on each of the multiple computing nodes and/or determining the aggregate usage of one or more types of computing resources across the cluster of multiple computing nodes by the distributed program execution. The dynamic modifying of the distributed program execution may include, for example, adding and/or removing computing nodes from the cluster that is executing the program, modifying the amount of computing resources that are available for the distributed program execution, temporarily throttling usage of computing resources by the distributed program execution (e.g., if the distributed program execution is using more computing resources than allocated or otherwise expected, if one or more bottlenecks exist with respect to executing programs of other users), terminating or temporarily suspending execution of the program (e.g., if an insufficient quantity of computing nodes of the cluster are available to perform execution), etc.

The dynamic monitoring of the ongoing distributed execution of a program on a cluster of multiple computing nodes may be performed in various manners in various embodiments. For example, in some embodiments and for some types of programs, a program may be separated into multiple execution jobs that are each executed on one of the computing nodes of the cluster, and one or more of the cluster computing nodes may further be selected as a master computing node that controls at least some aspects of the distributed execution of the program across the other computing nodes of the cluster. In such embodiments, the master node may gather some types of status information, such as from the execution jobs executing on other cluster computing nodes (e.g., a stage or phase of execution of an execution job, such as with respect to particular operations that are performed; an estimate of the amount of execution that has been performed and/or is remaining, such as measured by time or a percentage completeness; etc.), and if so the DPE service may automatically obtain some or all of that status information from the master node. In other embodiments, the DPE service may automatically gather other types of status information, such as directly from execution jobs executing on the cluster computing nodes, by interacting with manager modules of the DPE service that are local to various of the cluster computing nodes to determine status information for that computing node, etc.

Furthermore, in at least some embodiments, the dynamic monitoring may include automatically gathering information about various types of resource usage by the distributed execution of a program, such as resource usage specific to one or more particular cluster computing nodes that execute the program and/or aggregate resource usage from the distributed execution of the program across the entire cluster of computing nodes. The types of resource usage that are monitored and measured may vary in various embodiments, such as to include one or more of the following non-exclusive list, and may further be measured in absolute terms (e.g., a measured quantity of use) and/or in relative terms (e.g., a percentage used of the total available, to reflect the difference between an amount used by one program and the amount used by another program, etc.): network bandwidth capacity used, such as between two or more computing nodes of the cluster or more generally for any network resources used by the DPE service; disk I/O ("input/output") capacity used for a particular cluster computing node and/or for a particular hard disk or other storage device used by one or more cluster computing nodes; amount of volatile or non-volatile memory used; amount of non-volatile storage used; amount of CPU cycles used or other measure of CPU utilization; bus bandwidth capacity specific to a particular cluster computing node; etc. In addition, in at least some embodiments, the dynamic monitoring may further include automatically determining whether the execution of one or more programs by the DPE service is contributing to a bottleneck with respect to access of one or more types of computing resources for other programs, such as for other programs of the DPE service. Such bottleneck detection may be performed in various manners, including by detecting when usage of particular computing resources rises above predefined thresholds, by detecting when performance of one or more other programs are having their execution delayed or otherwise hindered due to lack of available computing resources, etc. Additional details related to dynamically monitoring the ongoing distributed execution of a program on a cluster of multiple computing nodes are included below.

In addition, the dynamic modifying of the ongoing distributed execution of a program on a cluster of multiple computing nodes may be performed in various manners in various embodiments, including in some embodiments and situations based on information obtained from dynamic monitoring activities (e.g., to reduce or eliminate bottlenecks). For example, in some embodiments and for some types of programs, the dynamic modifying may include automatically changing the multiple computing nodes of a cluster being used for distributed execution of a program while the distributed execution is ongoing, such as to expand the cluster during ongoing execution by adding one or more additional computing nodes and/or to shrink the cluster during ongoing execution by removing one or more of the computing nodes from the cluster. Cluster expansion may be performed, for example, to enable program execution to complete sooner, such as if execution on one or more cluster computing nodes is taking longer than expected, if execution of the program is being hindered by lack of sufficient computing resources and the additional computing nodes will provide access to additional computing resources that were lacking, if a master node or other cluster computing node has failed or otherwise become unavailable and the additional computing node(s) are configured to automatically take the place of the unavailable computing nodes, etc. Cluster shrinking may be performed, for example, to more efficiently use resources, such as if the distributed program execution is progressing faster than expected, if one or more cluster computing nodes are using too many computing resources and those computing nodes are shut down to throttle the excess computing resource usage, if one or more cluster computing nodes are not currently being used (e.g., have completed their portion of the distributed program execution and are removed from the cluster so as to be available for other uses and/or to prevent the ongoing distributed program execution from being responsible for ongoing fees for the computing node if it was part of the cluster), to remove all computing nodes from a cluster if a sufficient subset of the cluster computing nodes are not available for the ongoing execution (e.g., during an initial phase of the distributed program execution if a minimum percentage of cluster computing nodes and/or a minimum absolute quantity of cluster computing nodes have not completed their initialization and begun program execution within a predetermined period of time), etc.

Furthermore, in at least some embodiments, the dynamic modifying of the ongoing distributed execution of a program on a cluster of multiple computing nodes may include automatically adjusting resource usage by the distributed program execution in manners other than by expanding or shrinking the cluster of computing nodes. For example, in at least some embodiments, the usage of one or more types of resources by one or more cluster computing nodes may be increased or decreased in various manners, such as by interacting with a module of the DPE service that is local to those cluster computing nodes to temporarily or permanently expand or restrict access to one or more types of computing resources by the execution jobs of the program being executed on those computing nodes (e.g., to limit network bandwidth usage by restricting how many communications are allowed to be sent over the network on behalf of the program; to expand storage space available to the program by changing an amount of storage allocated to the program and/or by reducing the amount of storage on a shared storage device that is being used by one or more other programs; etc.). In addition, in at least some embodiments, resource usage by one or more cluster computing nodes for distributed execution of an indicated program may be modified in other manners, such as by directly interacting with the indicated program to indicate a change in resource usage limits that are in use by the indicated program, by reducing or expanding the amount of resource usage by one or more other programs that share one or more types of computing resources with the indicated program so as to correspondingly expand or reduce the amount of resources available to the indicated program, by moving portions of the distributed program execution within the computing nodes of the cluster (e.g., to balance computing resource usage if some cluster computing nodes are under-utilized with respect to one or more types of computing resources and other cluster computing nodes are over-utilized with respect to those types of computing resources, by moving computing-resource intensive portions of the distributed program execution to cluster computing nodes that are configured or otherwise specialized for that type of computing resource usage, etc.), by moving portions of the distributed program execution to different computing nodes outside the cluster (e.g., if the aggregate computing resource usage for distributed execution of an indicated program is high with respect to network bandwidth capacity but low with respect to other types of resource usage, changing the computing nodes of the cluster so that the total quantity stays the same but the new cluster computing nodes are located closer together within the network or are provided with access to network bandwidth that is not used by or is under-utilized by other programs), etc. Additional details related to dynamically modifying the ongoing distributed execution of a program on a cluster of multiple computing nodes are included below.

In addition, after program execution is requested or otherwise initiated, whether by a user or in another manner, that program execution may be separated into multiple execution jobs for parallel or other distributed execution in various manners in various embodiments. For example, as previously noted, the program may be designed to be separable in a defined manner into distinct execution jobs (e.g., to support task-level parallelism), and if so a user may indicate how to generate multiple execution jobs and/or the DPE service may automatically generate the multiple execution jobs. Furthermore, some types of programs may perform various operations on each of a number of pieces of input data, and in such situations, data parallelism techniques may be used to separate the group of input data for use in the program execution into multiple subsets that are each supplied to a distinct execution job (e.g., with each execution job performing some or all of the same operations on the input data subset used for that execution job). As one simple example, a particular program execution may include searching a large number of Web pages for two particular terms (or alternatively indexing the Web pages for use in later searches), and the program execution may be separated into a large number of execution jobs that execute simultaneously in parallel to each search (or index) a distinct subset of the Web pages (e.g., a single Web page, or a small number of the Web pages) for one or both of the terms. Non-exclusive examples of types of programs that may be separated into multiple execution jobs (e.g., to support task parallelism and/or data parallelism) include the MapReduce program for processing and generating large data sets, the Hadoop program implementation of MapReduce execution methodology, the Hive data warehouse infrastructure that uses Hadoop, the Pig structured query language for use with HDFS ("Hadoop Distributed File System") data, the HBase open-source distributed database, various types of image, video and speech processing, various types of analysis of and searching through textual data sets or other types of input data, etc. Additional details related to the MapReduce program are included in "MapReduce: Simplified Data Processing on Large Clusters" by Jeffrey Dean and Sanjay Ghemawat, December 2004, Proceedings of OSDI'04: Sixth Symposium on Operating System Design and Implementation, available at the time of application filing at labs<dot>google<dot>com<slash>papers<slash> mapreduce-osdi04.pdf (where "<dot>" and "<slash>" are replaced with corresponding characters "." and "/"), which is incorporated herein by reference in its entirety.

In addition, in at least some embodiments, the tracking and other dynamic monitoring of the ongoing distributed execution of a program may include monitoring some or all execution jobs for the program, such as to determine when particular execution jobs begin execution and complete execution. Such monitoring of the execution of execution jobs may provide various benefits, such as to determine when to later initiate execution of other execution jobs (e.g., if the output data generated by a first execution job is at least some of the input data for a second execution job, so as to assist in determining when to execute the second execution job), and/or to determine when all execution jobs of a program have been completed. Furthermore, in at least some embodiments, some or all execution jobs may each have multiple distinct operations (which also may be referred to as "tasks" in some situations) that are to be performed, such as in a sequential and/or parallel manner, and the monitoring or other tracking of the ongoing execution of such execution jobs may further include determining information about the status of the partial performance of some or all such operations, such as to reflect intermediate data that is generated by completed performance of some such operations. Such tracking of the performance of particular operations for an execution job may further provide various benefits, such as to enable the ongoing intermediate execution and data state from the partial execution of the execution job to be tracked and used, as described in greater detail below. The monitoring may include using a system manager module to initiate execution of execution jobs on particular computing nodes, and to subsequently obtain status information from the computing nodes (e.g., by the system manager module pulling status information from the computing nodes, such as by periodically requesting status information from each computing node, and/or by the computing nodes pushing status information to the system manager module, such as periodically or when particular events occur).

When executing an execution job for a program on a computing node, various information related to the execution may be stored in various manners. For example, when the execution is initiated, the input data to be used by the execution job may be locally stored on the computing node (e.g., on a local hard disk or other local storage device) to facilitate access to that input data during execution, and any software instructions to be executed for the execution job may similarly be locally stored on the computing node. Such information to be locally stored may be supplied to the computing node under control of the system manager module of the DPE service, such as from a highly available long-term storage location for the DPE service that is remote from the multiple computing nodes used to execute the program (e.g., a long-term storage location that is available from a network-accessible remote storage service). In addition, after the execution of the execution job is completed and any output data from the execution is generated, that output data may similarly be locally stored on the computing node, such as temporarily until that output data is copied back to the long-term storage location for the DPE service for use by other execution jobs or otherwise in generating the final output results for the execution of the program. After the execution of the execution job of the program is completed, the local storage on the computing node may in some embodiments be erased or otherwise cleared after any output data from the execution is copied back to the DPE service's long-term storage location, such as in preparation for or as part of initiating execution of another execution job on the computing node (e.g., another execution job of a different program for a different user). In other embodiments, the local storage on the computing node may instead be maintained even after the execution of an execution job is completed (e.g., until execution of the program is complete).

Furthermore, in at least some embodiments, various intermediate output data and other intermediate results from the partial execution of an execution job on a computing node may be stored locally on the computing node during the execution, such as to correspond to output data produced by a subset of the operations of the execution job whose performance is completed, and/or to correspond to partial or incomplete output data produced by one or more operations whose performance has been initiated but not completed. In at least some embodiments in which a long-term storage location of the DPE service is used, such intermediate results are not stored on the DPE service's long-term storage location (e.g., to minimize execution delay and network traffic involved in copying such intermediate results to the DPE service's long-term storage location), while in other embodiments some or all such intermediate results may be stored on the DPE service's long-term storage location.

As one example of intermediate results, referring back to the prior simplified example of an execution job that involves searching through multiple Web pages for two terms, each operation of the execution job may correspond to searching through a single Web page for a single term, with the intermediate output data from performance of such an operation being information about any occurrences of that term in that Web page (e.g., a cumulative number of times that the term is located; information about each occurrence of the term in that Web page, such as its location in the Web page; etc.). Alternatively, as another example, a particular execution job may involve searching through a Web log or other transaction record that has numerous entries (e.g., with each line in the Web log representing an entry) for a particular term, and each operation of the execution job may involve searching a particular input data entry for that term, with the intermediate output data from performance of such an operation similarly including information about whether the input data entry includes the term.

By storing the output data from the completed execution of an execution job in the DPE service's long-term storage location, the availability of that output data may be maintained even if a particular computing node subsequently fails or otherwise becomes unavailable. However, if intermediate results from partial execution of an execution job are not stored on the DPE service's long-term storage location, a termination of the execution of that execution job before completion may result in those intermediate results being lost, such that the execution job would need to later be executed again from the beginning (e.g., to repeat performance of all operations of the execution job, even if some of the operations were previously completed). Accordingly, distributed execution of a program is managed by the DPE service in at least some embodiments in such a manner as to store and use such intermediate results from partial execution of an execution job that is temporarily terminated or otherwise suspended before completion, so that a later resumption of the execution of the execution job may resume at or near the intermediate point of partial execution before termination. For example, if a determination is made to terminate execution of one or more execution jobs of a program on one or more computing nodes before the execution of those execution jobs is complete, the system manager component may initiate the persistent storage of the intermediate results from the partial execution of those execution jobs, such as at a location remote from those computing nodes. When the execution of those execution jobs is later resumed, whether on those same computing nodes or other computing nodes, the persistently stored intermediate results from the prior partial executions may be retrieved and used in the resumed execution in various ways. For example, if multiple operations of a particular terminated execution job had been completed before the termination, the intermediate results from the performance of those operations may be retrieved for the resumed execution, and those completed operations need not be performed again for the resumed execution.

The termination of partially completed execution jobs may be performed for various reasons in various embodiments. For example, in some embodiments a user who has requested execution of a program may request that the execution of some or all execution jobs for the program be suspended, such as for an indicated period of time or until the user later requests a resumption of the program suspension. In other embodiments, the DPE service may initiate the termination of the execution of one or more execution jobs of a program. For example, the execution of an execution job on a first computing node may be terminated and moved to another second computing node, such as if the first computing node is to be shut down for maintenance, is to be used for another execution job or other program (e.g., another execution job or other program with a higher priority), is being over-utilized, is showing signs of possible failure, is over-using one or more types of computing resources, etc. In addition, in a manner similar to that of the indicated user request, the DPE service may determine to suspend all execution of a program for a period of time.

In addition, as previously noted, in at least some embodiments, execution of an execution job that is automatically terminated may be automatically resumed at a later time by the DPE service. For example, in some such cases, the DPE service may continue to try to execute such an execution job until completion of the requested execution, until execution is cancelled or otherwise explicitly terminated by a user, until occurrence of a specified time (e.g., until occurrence of an expiration time, until occurrence of a cumulative execution time, etc), until occurrence of a specified number of executions, indefinitely, etc. In addition, in at least some such embodiments, at least some execution jobs that are automatically terminated may be automatically resumed on behalf of the user at a future time when a sufficient amount of program execution capacity again becomes available to continue the execution. Similarly, if the ongoing distributed execution of a program is stopped due to an insufficient quantity of computing nodes of a cluster being available to perform the distributed execution or otherwise having insufficient computing resources to perform the distributed execution, the DPE service may reschedule the distributed execution for a later time and/or automatically restart the distributed execution at a future time when a sufficient quantity of computing nodes or other sufficient amount of program execution capacity again becomes available to continue the execution.

As previously noted, various information may be locally stored on a computing node during execution of an execution job, and the locally stored information may be stored in various manners. For example, in some embodiments, a distributed file system or other distributed data store may be created on the multiple computing nodes used for distributed execution of a program, with a particular computing node's locally stored data being stored in the local portion of that distributed data store. Furthermore, if the distributed data store for a particular embodiment includes redundant data that allows for recovery of the data locally stored on a particular computing node that fails or otherwise becomes unavailable, then the availability of the output data from the execution of an execution job may be maintained in many situations for that embodiment even without the use of separate long-term storage for the DPE service. In other embodiments, some or all information may be stored in other manners, such as by not using a long-term storage location of the DPE service (e.g., by maintaining locally stored data on computing nodes until all execution for the program is completed) and/or by not using local storage on the computing nodes selected to assist in the distributed execution of a program (e.g., by storing any information that is not loaded in volatile memory on the computing node at a remote location, such as the DPE service's long-term storage location).

In addition, when intermediate results of partial execution on a computing node are persistently stored remotely from the computing node, the intermediate results may be stored in various manners. In some embodiments in which the DPE service uses a long-term storage location, the intermediate results may be stored in the DPE service's long-term storage location along with other completed results of execution jobs that have been completed. Alternatively, in some embodiments, the intermediate results for a particular computing node may be stored together, but in a manner distinct from the intermediate and/or completed results of other computing nodes. For example, in some embodiments, a remote logical storage volume may be created to mirror some or all of a local hard disk or other block data storage device for the computing node that was used to store the intermediate results, including a local portion of a distributed file system or other distributed data store. When the partial execution of the execution job for the computing node is later resumed, such a remote logical storage volume may be attached to the computing node on which the resumed execution is to occur, such as to allow the information in the attached logical storage volume to be copied to a physical block storage device of that computing node for use during the resumed execution, or the attached logical storage volume may instead be used during the resumed execution in lieu of any physical block storage device of that computing node. In some such embodiments in which logical storage volumes are available for use, the logical storage volumes may be created at the time of termination of an execution job on a computing node, while in other embodiments the logical storage volume for an execution job may be created at the beginning of the initial execution of the execution job on a computing node and used throughout the entire execution (e.g., in lieu of any physical block storage device of that computing node), even if the execution of the execution job is terminated and resumed one or more times.

Additional details related to the operation of examples of remote storage services that may be used to persistently store program state information and/or other information, including logical storage volumes, are available in U.S. patent application Ser. No. 12/188,943, now U.S. Pat. No. 8,015,343, filed Aug. 8, 2008 and entitled "Providing Executing Programs With Reliable Access To Non-Local Block Data Storage;" and in U.S. patent application Ser. No. 11/371,304, now U.S. Pat. No. 7,716,180, filed Mar. 8, 2006 and entitled "Distributed Storage System With Web Services Client Interface" and claiming priority benefit of U.S. Provisional Patent Application No. 60/754,726 filed Dec. 29, 2005, each of which is hereby incorporated by reference in its entirety. In addition, additional details related to example embodiments of executing different programs of different priorities at different times and to techniques for suspending and resuming distributed execution of programs are included in U.S. patent application Ser. No. 12/334,022, now U.S. Pat. No. 8,249,904, filed Dec. 12, 2008 and entitled "Managing Use Of Program Execution Capacity," and in U.S. patent application Ser. No. 12/334,004, now U.S. Pat. No. 8,370,493, filed and entitled "Saving Program Execution State," each of which is hereby incorporated by reference in its entirety. Furthermore, additional details related to enabling users to configure and modify distributed program execution are included in U.S. patent application Ser. No. 12/415,649, now U.S. Pat. No. 8,819,106, filed Mar. 31, 2009 and entitled "Managing Distributed Execution Of Programs," and in U.S. patent application Ser. No. 12/415,725, now U.S. Pat. No. 8,296,419, filed Mar. 31, 2009 and entitled "Dynamically Modifying A Cluster Of Computing Nodes Used For Distributed Execution Of A Program," each of which is also hereby incorporated by reference in its entirety.

In addition, as previously discussed, the managing of distributed execution of programs may be performed in various manners in various embodiments. For example, the determination of which computing nodes to use for execution of a program may be made in a variety of ways, including based on any preferences and/or requirements specified in configuration information that accompanies initiation of program execution or otherwise specified for the program and/or associated user (e.g., at a time of registration, etc.). For example, if criteria are determined for preferred and/or required resources for execution of a program (e.g., memory and/or storage; CPU type, cycles or other performance metric; network capacity; platform type, etc.), the selection of appropriate computing nodes to use may be based at least in part on whether the computing nodes have sufficient resources available to satisfy those resource criteria. In at least some situations, the initiation of the distributed execution of an indicated program on multiple selected computing nodes of a cluster by the DPE service includes some or all of the following non-exclusive actions: selecting multiple computing nodes to be used as the cluster to perform the distributed execution of the indicated program; identifying one or more of the multiple nodes of the cluster to act as master nodes that control the execution of the program on the other nodes of the cluster; provisioning the multiple computing nodes of the cluster if needed to prepare them to receive software to be executed and input data to be used; obtaining the indicated input data to be used by the distributed execution of the indicated program; separating the obtained input data into multiple subsets that are each to be used on one of the multiple computing nodes of the cluster; separating the indicated program into multiple execution jobs to be executed on the multiple computing nodes of the cluster; for each of the multiple computing nodes, loading on the computing node software and optionally input data to be used for the distributed execution of the indicated program (e.g., software to execute at least one execution job for the computing node and a determined subset of the indicated input data to be used by the computing node); optionally configuring the loaded software on the various computing nodes (e.g., configuring the software loaded on the one or more master computing nodes to be able to use the other computing nodes of the cluster); establishing access controls for the multiple computing nodes of the cluster that enable the multiple computing nodes to inter-communicate as part of the executing of the indicated program; etc. Additional details related to executing and configuring programs to execute on a program execution service are included in U.S. patent application Ser. No. 11/395,463, now U.S. Pat. No. 8,190,682, filed Mar. 31, 2006 and entitled "Managing Execution of Programs by Multiple Computing Systems," which is hereby incorporated by reference in its entirety.

In some embodiments, fees may be associated with the use of a DPE service, such that the DPE service may perform distributed execution of programs on behalf of a user in exchange for payment of one or more fees by that user. For example, in some embodiments, fees may be charged to a user based on an amount and/or type of distributed program execution capacity allocated for executing one or more programs on behalf of a user, such as based on one or more of a number of computing nodes in a cluster, a number of processing units, an amount of memory, an amount of storage, an amount of network resources, etc., allocated for executing programs of the user. In addition, in some embodiments, fees may be charged to a user based on an amount of computing node local storage that is used to store program data for the user, such as for times during which a corresponding program is not being executed, or instead regardless of whether or not such a corresponding program is being executed. In some embodiments, fees may be based on other factors, such as various characteristics of the computing resources used to execute programs, such as, for example, based on CPU capabilities or performance, platform type (e.g., 32-bit, 64-bit, etc.), etc. Fees may also be charged on the basis of a variety of use factors in some embodiments, such as a price per use of the service, a price per unit of time that computing services are used, a price per storage used, a price per data transferred in and/or out, etc. In at least some embodiments, a provider of a DPE service may offer one or more of various tiers, types and/or levels of services or functionality for distributed execution of programs on behalf of multiple users, and in some such embodiments, various fees may be associated with the various tiers, types and/or levels of services. Additional details related to various fees associated with a distributed program execution service are included in U.S. patent application Ser. No. 11/963,331, now U.S. Pat. No. 8,788,379, filed Dec. 21, 2007 and entitled "Providing Configurable Pricing for Execution of Software Images," which is hereby incorporated by reference in its entirety.

In addition, as previously noted, in at least some embodiments the DPE service provides an API to enable users to programmatically configure the distributed execution of programs and to modify ongoing distributed program execution. The following include non-exclusive examples of functions that may be provided as part of such an API: describe-cluster; run-cluster; terminate-cluster; set-cluster-proxy; uploadmapped-jar; upload-data; start-program; cancel-program; and get-program-status, in which "jar" refers to a file containing the indicated program to be executed. Furthermore, in at least some embodiments users may be enabled to configure a variety of characteristics for their clusters, including, for example, a degree of replication regarding how many copies (if any) to maintain of intermediate data during program execution, memory allocation to be used for particular programs (e.g., for use with a Java virtual machine), a loglevel for which information is tracked during debugging, etc. It will be appreciated that an API may include other functionality and be defined in other manners in other embodiments, and that the various functions of the API may each have appropriate variables or parameters whose values are specified as part of invoking the function.

In addition, in at least some embodiments, the DPE service may provide other types of functionality in at least some situations. For example, a user may initiate the distributed execution of a first program on a cluster of multiple computing nodes, but may maintain the cluster of multiple computing nodes even after the distributed execution of the first program has ended. One reason that the user may maintain the cluster is to execute a distinct second program on the existing cluster after the first program has ended, such as a second program that uses the same or similar configuration (e.g., the same type of program but with a new input data set), or instead a second program that uses generated results or other output data from the execution of the first program as input data for the distributed execution of the second program. As another example, in some embodiments, a user may be allowed to specify input data for use in the distributed execution of a program that is not static, such as if the input data continues to grow or expand while the program is executing—one example is a log file for a Web site or data that indicates ongoing transactions, with the distributed execution of the program analyzing each entry in the log or transaction data, such that the new log/transaction entries are analyzed as they are received (or later if the processing of the log/transaction data has not yet reached those new entries at the time of their receipt). Furthermore, in some embodiments a user may specify one or more types of limits regarding the distributed execution of a program (e.g., an amount of execution time; a cost of execution; an amount of usage of one or more types of computing resources, such as memory, storage, disk I/O, network I/O; etc.), with various specified types of actions that the DPE service is to take if a specified limit is reached (e.g., to notify the user, to suspend or terminate execution of the program, to reduce usage of a type of resource corresponding to the limit, etc.).

Furthermore, various other types of functionality may be provided and used by a DPE service in various embodiments, as discussed in greater detail elsewhere.

Figure 3:
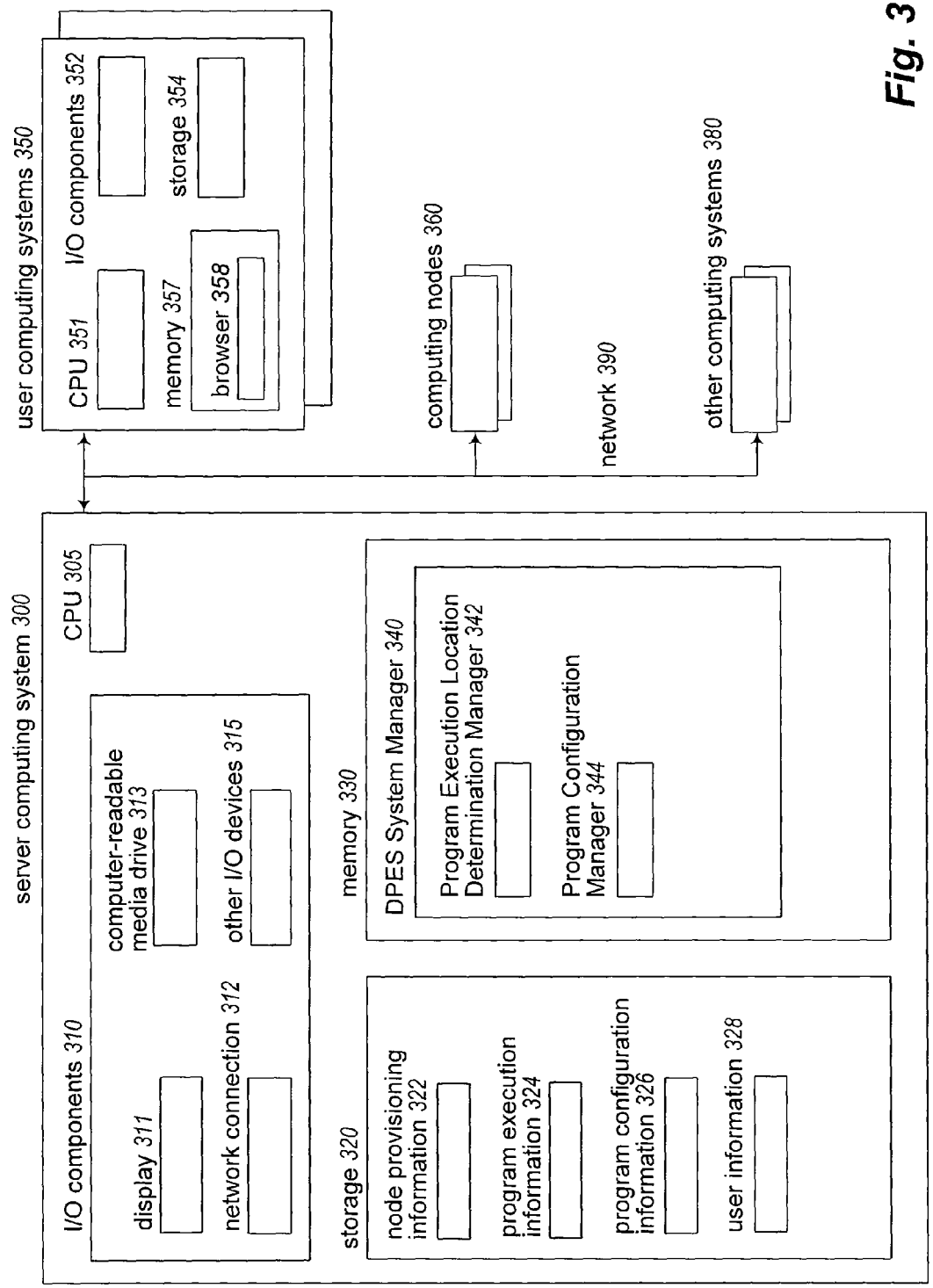
FIG. 3 is a block diagram illustrating an example embodiment of a computing system for managing distributed program execution.

FIG. 3 is a block diagram illustrating an example embodiment of a system suitable for performing techniques to manage distributed execution of programs. In particular, FIG. 3 illustrates a server computing system 300 suitable for executing an embodiment of a Distributed Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 380 and computing nodes 360 may also each include similar components to some or all of the components illustrated with respect to server computing system 300, but such components are not illustrated in this example for the sake of brevity.

An embodiment of a Distributed Program Execution Service System Manager module 340 is executing in memory 330, such as under control of CPU 305, and it interacts with computing systems 350 and 380 and computing nodes 360 over the network 390 (e.g., via the Internet and/or the World Wide Web, via a private cellular network, etc.). In this example embodiment, the DPESSM module 340 includes functionality related to managing distributed execution of programs on computing nodes 360 by various users (not shown) interacting with user computing systems 350, such as in conjunction with a DPE service managed by the DPESSM module 340. The other computing systems 350 and 380 and computing nodes 360 may be executing various software as part of interactions with the DPESSM module. For example, user computing systems 350 may be executing a Web browser 358 or other software in memory 357 to interact with DPESSM module 340, such as to interact with the DPESSM module to configure and/or request execution of programs on behalf of the users of those systems on one or more computing nodes 360 in various ways, and/or to track and optionally request modifications to ongoing distributed execution of programs. In addition, one or more users of the user computing systems 350 may interact with DPESSM module 340 to perform various other types of actions, as discussed in greater detail elsewhere.

Various information related to the operation of the DPESSM module 340 may be stored in storage 320, such as information 322 related to the computing nodes used to execute particular programs, information 328 about users of the distributed program execution service, information 324 that includes information about program execution (e.g., final execution results from program execution that has been completed, status information about the intermediate state of partial execution of various programs, etc.), and user-specified and other configuration information 326 used to configure distributed execution of programs (e.g., specified execution configuration parameters). In addition, various input data, intermediate data, final results, and other information may be stored in various manners, as discussed in greater detail elsewhere, including locally on computing nodes 360, on storage 320 of server computing system 300, on other computing systems 380, or on other computing nodes/systems or storage nodes/systems (not shown).

After the DPESSM module 340 receives requests (or other indications) to execute one or more programs on one or more computing nodes 360, along with specified configuration information, the DPESSM module 340 selects the computing nodes that will perform the distributed execution of the one or more programs, such as by the Program Execution Location Determination Manager module 342 based at least in part on the location of locally stored data on computing nodes, as discussed in greater detail elsewhere. The DPESSM module 340 then initiates execution of execution jobs of those programs on those selected computing nodes 360. In addition, the DPESSM module 340 may further interact with computing nodes 360 in other manners, such as to copy input data between computing nodes, to move program execution between computing nodes, to temporarily terminate or otherwise suspend execution of execution jobs on the computing nodes and to resume previously terminated execution, to dynamically monitor or otherwise interact with one or more of the computing nodes 360 to track use of those computing nodes, to dynamically modify the ongoing distributed execution of programs on the computing nodes 360, etc. Furthermore, the Program Configuration Manager module 344 of DPESSM module 340 may perform various actions to facilitate configuring the distributed execution of other programs, any may store determined configuration information as part of configuration information 326. Additional details related to these operations are included elsewhere.

The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the DPESSM module 340 may interact with one or more other computing systems 380 to initiate, suspend or resume execution of one or more programs on those computing systems, such as if the computing systems 380 are provided by one or more third-party participants.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated DPESSM module 340 may in some embodiments be distributed in additional modules. Similarly, in some embodiments some of the functionality of the DPESSM module 340 may not be provided and/or other additional functionality may be available.

It will also be appreciated that, while various items are illustrated as being stored in memory or on storage while being used, these items or portions of them may be transferred between memory and other storage devices, such as for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
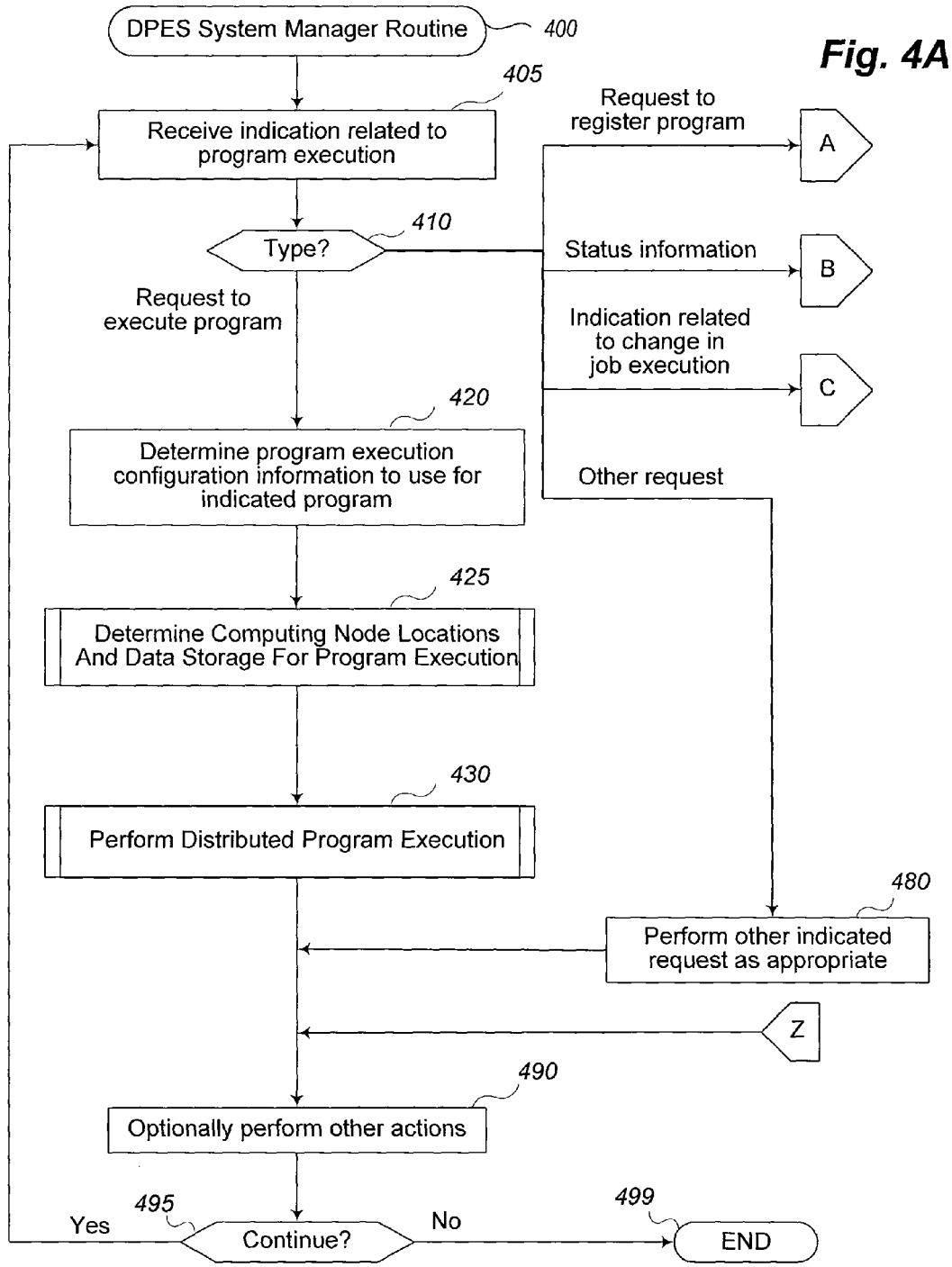
FIGS. 4A-4B illustrate a flow diagram of an example embodiment of a Distributed Program Execution Service System Manager routine.
Figure 4B:
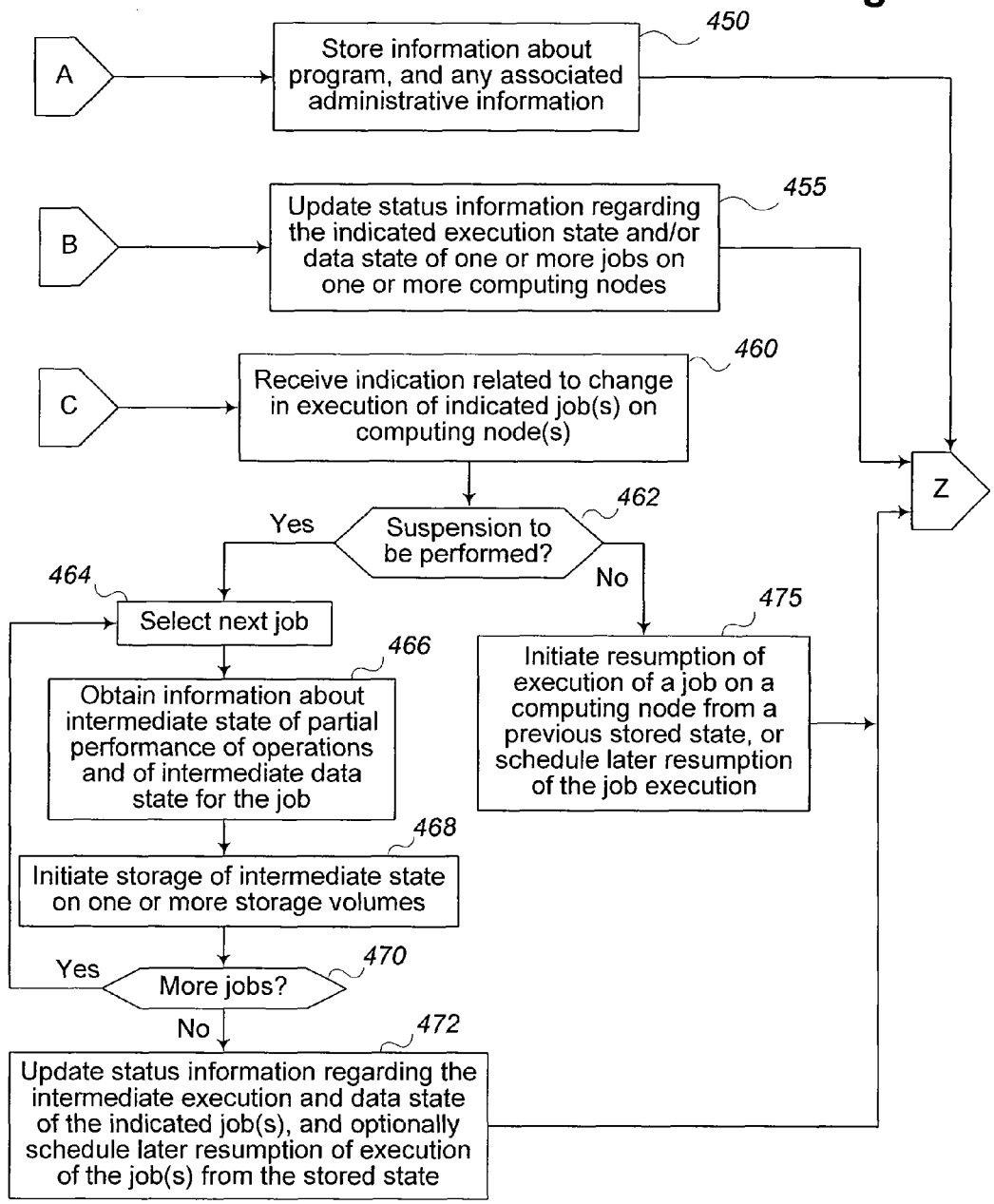

FIGS. 4A-4B are a flow diagram of an example embodiment of a Distributed Program Execution Service System Manager routine 400. The routine may be provided by, for example, execution of the DPESSM modules 110 and 180 of FIGS. 1A and 1B, respectively, and/or the DPESSM module 340 of FIG. 3, such as to manage distributed execution of programs, as well as to perform other types of actions in some situations. In this illustrated embodiment, the routine 400 manages various aspects of use of a DPE service that performs distributed execution of programs on behalf of multiple users.

In the illustrated embodiment, the routine begins at block 405, where information or an instruction related to distributed program execution is received. The routine continues to block 410 to determine the type of received information or instruction. If it is determined in block 410 that a request is received to initiate execution of a program, such as from a user, the routine continues to block 420 to determine program execution configuration information for use in the program execution (e.g., a quantity of computing nodes for a cluster to execute the program, input data to be used by the program execution, etc.), such as may be received in block 405, automatically determined, and/or interactively retrieved from a user associated with the program execution. After block 420, the routine continues to block 425 to execute a routine to determine locations of locally stored data and to select computing nodes for program execution, with one example of such a routine being described in greater detail with respect to FIG. 5. After block 425, the routine continues to block 430 to execute a Perform Distributed Program Execution routine, with one example of such a routine being described in greater detail with respect to FIG. 6. While the activities of blocks 420-430 are illustrated as being performed in a synchronous manner in this example, such that the routine 400 does not perform other operations during those blocks, it will be appreciated that the routine may continue to perform other operations asynchronously and simultaneously with the actions of blocks 420-430 in some embodiments, including to monitor and modify ongoing program execution with respect to those blocks, as well as to perform other actions with respect to executing other programs for other users, as described elsewhere.

If it was instead determined in block 410 that the information or instruction received in block 405 was a request to register a program for later use, such as from a user, the routine instead continues to block 450 to store information about the program, along with associated administrative information (e.g., information about the user who submitted the program and/or about execution of the program, such as how to separate the program into multiple execution jobs, a type of the program, particular input data associated with the program, etc.). In some embodiments, such programs may be registered by users before they are used, such as to increase the speed of executing the program when such a program execution request is later received. Furthermore, in some embodiments, such a request to register a program may include a request to schedule later execution of the program, such as at an indicated time or when one or more indicated criteria are satisfied (e.g., when sufficient excess computing capacity of the DPE service is available to execute the program at a low priority).

If it is instead determined in block 410 that the information or instruction received in block 405 is status information related to execution of an execution job on a computing node for a program, such as may be supplied by that computing node or execution job (e.g., after being previously requested by the routine 400 as part of block 430 or block 490), the routine continues to block 455 to update status information that is maintained by the routine 400 regarding the intermediate state of execution of that execution job and program. As discussed in greater detail elsewhere, the status information may include information about particular operations that have been initiated, completed, or are in progress, information about input data that has been used by the execution, information about output data that has been generated by completion of some or all operations, information about partial intermediate data that reflects ongoing execution of the execution job, etc.

If it is instead determined in block 410 that the information received in block 405 is an indication related to suspending or resuming execution of one or more execution jobs for one or more programs, such as from a user who initiated that execution and/or as previously specified by the routine 400 with respect to block 490, the routine continues to block 460 to receive information related to the execution modification. In block 462, the routine then determines whether the request relates to a temporary termination or other suspension of one or more currently executing execution jobs, or if it is instead related to resuming execution of a previously suspended execution job. If the latter, the routine continues to block 475 to initiate the resumption of execution of a previously suspended execution job on a computing node, such as by using previously stored state information about the intermediate results from the previous partial execution of the execution job (e.g., by issuing a new request to routine 400 to perform that resumed execution, such as to be handled with respect to blocks 420-430 by selecting computing nodes to use based at least in part on locally stored data), or instead schedules a later such resumption of the execution job if so indicated in the information received in block 460.

Otherwise, if there are one or more currently executing execution jobs to be temporarily terminated, the routine continues from block 462 to block 464 to select the next such execution job, beginning with the first. In block 466, the routine then obtains information about the current intermediate state of the partial execution of the operations being performed for the execution job and about the current data state for the execution job, and in block 468 initiates the storage of the intermediate state information on one or more storage volumes remote from the computing node that will persistently store the information for later use (e.g., such as by copying data locally stored on the computing node as part of the ongoing execution). In other embodiments, such as if the computing node includes management software to perform such intermediate state storage actions or if the execution job itself is configured to save its own intermediate state when instructed, the routine 400 may instead in block 466 and 468 send a message to the computing node and/or execution job to initiate such storage and then shut down. Furthermore, previously saved status information about the execution job may in some situations be used in blocks 466 and 468, such as to determine what intermediate state information is be stored, and any new information obtained in block 466 (e.g., by communicating with the computing node and/or execution job) may be used to update the status information for that execution job. In other embodiments, block 468 may not be performed, such as if locally stored data on the computing nodes will instead be later used in lieu of any remotely stored data. The routine then continues to block 470 to determine if there are more execution jobs to be terminated, and if so returns to block 464. As previously discussed, in some embodiments the temporary termination may include temporarily terminating all execution jobs currently being executed for a program, such as to temporarily suspend execution of the program.

If it is instead determined in block 470 that there are no more execution jobs to terminate, the routine in block 472 updates status information regarding the intermediate state of the terminated execution jobs, and optionally schedules a later resumption of the execution of some or all of the execution jobs from the stored intermediate state. For example, in situations in which one or more execution jobs are being moved from a first group or one or more computing nodes to a second group or one or more other computing nodes, the later scheduled resumption of the execution of those execution jobs may occur in a substantially immediate manner, such that a user may be unaware of the termination and resumption of execution or of the movement of the execution job between computing nodes. In addition, the scheduling of the later resumption may include initiating a new request to be received in block 405 at the time of the later resumption that will prompt the previously discussed resumption activities with respect to block 475 for those execution jobs.

If it instead determined in block 410 that the type of information received in block 405 is another type of request, the routine continues instead to block 480 to perform the other indicated request as appropriate. Such other requests may include, for example, administrative operations with respect to users, such as users registering with the DPE service, users checking account information or other information of the DPE service, users tracking ongoing execution of their programs (e.g., by receiving some or all information about the intermediate state or other status of one or more of the execution jobs for the program), users providing payment with respect to currently or previously requested program executions or other provided functionality, etc.

After blocks 430, 450, 455, 472, 475, or 480, the routine continues to block 490 to optionally perform one or more other tasks. Such other tasks may include, for example, one or more of the following: the DPE service automatically initiating the monitoring of the execution of various programs, such as by sending requests for status information to computing nodes (e.g., periodically, when indicated criteria are satisfied, etc.); the DPE service automatically determining to temporarily terminate execution of execution jobs and/or to resume previously terminated execution of execution jobs in various circumstances, such as at scheduled times, to accommodate moving execution jobs between computing nodes, to maintain requested QoS levels for execution of a program (e.g., by maintaining execution of execution jobs within a maximum proximity to each other and/or to input data being used by the execution jobs, by maintaining a minimum proximity of execution to each other to enhance availability and reliability in the event of failure of multiple computing nodes in a single geographical location, etc.), to manage under-utilization and over-utilization of computing nodes (e.g., by modifying clusters and/or computing resources available to clusters), etc.

After block 490, the routine continues to block 495 to determine whether to continue, such as until an explicit indication to terminate is received (e.g., from an operator of the DPE service). If it is determined to continue, the routine returns to block 405, and if not continues to block 499 and ends.

Figure 5:
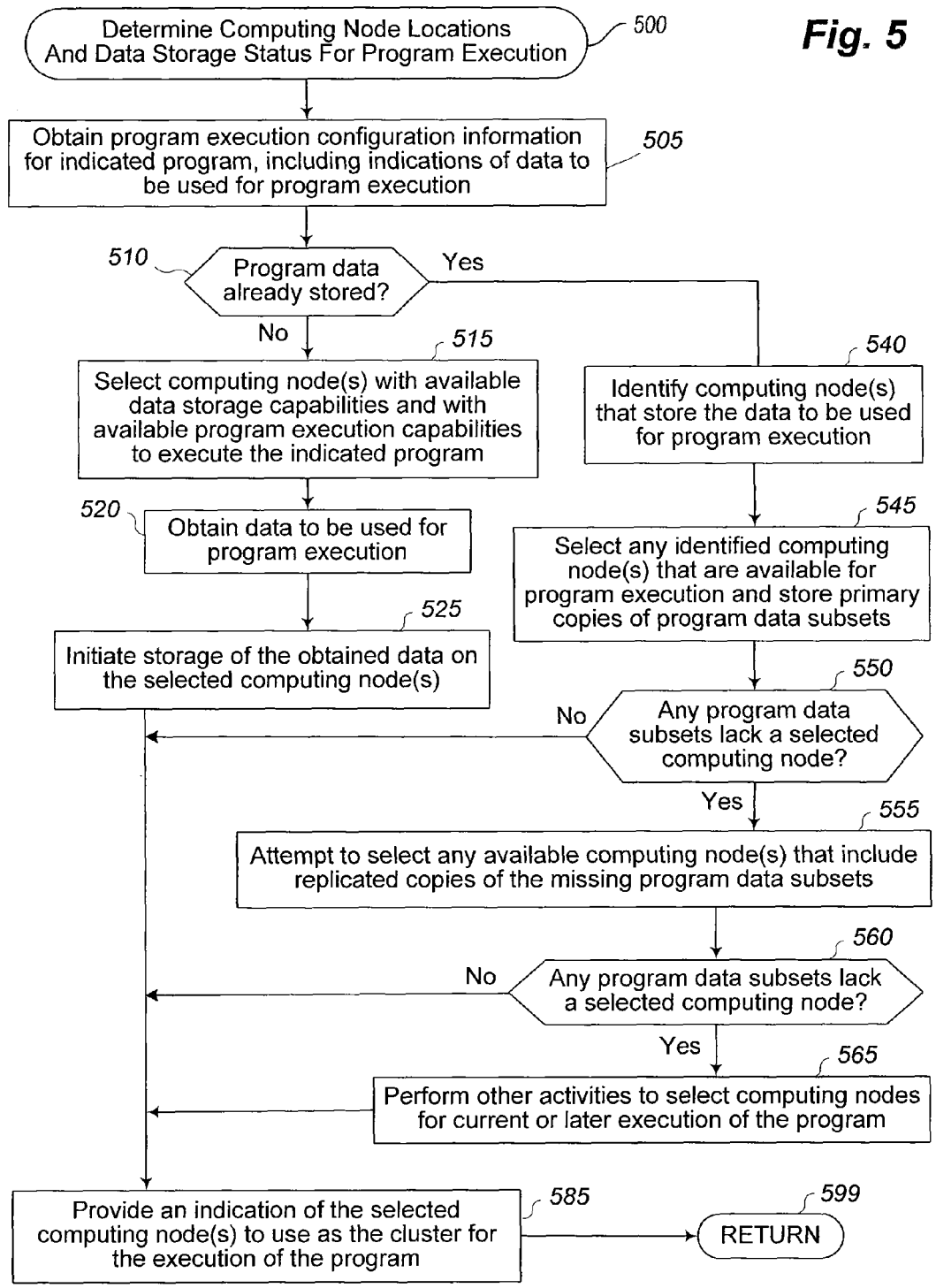
FIG. 5 illustrates a flow diagram of an example embodiment of a routine for determining computing node locations and data storage locations for program execution.

FIG. 5 is a flow diagram of an example embodiment of a Determine Computing Node Locations and Data Storage Status For Program Execution routine 500. The routine may be provided by, for example, execution of the Program Execution Location Determination Manager module 342 of the DPESSM module 340 of FIG. 3, or otherwise by the DPESSM modules 110 and 180 of FIGS. 1A and 1B, respectively, and may be initiated by block 425 of FIGS. 4A-4B. The routine 500 selects computing nodes for a cluster to use in executing a program, such as based at least in part on computing nodes that locally store input data to be used by the program, and otherwise performs actions to facilitate such computing node selection and use.

The routine begins in block 505, where configuration information for execution of a program is obtained, including an indication of program data to be used for the program execution, such as by receiving the configuration information determined in block 420 of FIGS. 4A-4B. Some or all such configuration information may be obtained from a user associated with the program execution, such as via interactions of the user with a GUI of the DPE service and/or interactions on behalf of the user with an API of the DPE service. The routine then continues to block 510 to determine if at least some of the indicated program data is already locally stored on one or more computing nodes of the DPE service. If not, the routine continues to block 515 to select computing nodes of the DPE service to use as part of a cluster for the program execution, such as to select a quantity of computing nodes specified in the configuration information, or as otherwise automatically determined (e.g., based on preferred or default configuration information, a number of computing nodes that are currently available from the DPE service, a number of computing nodes to correspond to a number of execution jobs into which the program execution will be separated, an amount of fees paid by a user on whose behalf the request is made, etc.). In the illustrated embodiment, the computing nodes are selected in block 515 so as to correspond to the obtained configuration information, to each have available local data storage capacity to store at least a portion of the program data to be used for the portion of the program execution to occur on the computing node, and to each be available to perform the portion of the program execution to occur on the computing node.

After block 515, the routine in block 520 obtains the program data, such as based on receiving the program data in block 505, or by retrieving the program data from one or more remote locations indicated in the configuration information. In block 525, the routine then initiates the storage of the program data on the selected computing nodes, such as by sending portions of the program data to each of the selected computing nodes. In particular, in at least some embodiments, the routine separates the program execution and the obtained program data into multiple execution jobs that each involves one or more operations to be performed, and then distributes the execution jobs and corresponding program data to the various selected computing nodes. The separation of the program into the multiple execution jobs may be performed in various manners in various embodiments, as discussed in greater detail elsewhere, such as in a manner specified in the program execution configuration information, in an automated manner based at least in part on the design of the program, etc. In other embodiments, rather than obtaining the program data and sending the obtained program data to the various selected computing nodes, the local storage of the program data on the selection computing nodes may be initiated in other manners, such as by sending instructions to some or all of the selected computing nodes to retrieve at least some of the program data corresponding to those computing nodes from indicated locations. After block 525, the routine continues to block 585 to provide an indication of the selected computing nodes to use as part of the cluster for the program execution, and then continues to block 599 and returns.

If it is instead determined in block 510 that at least some of the program data is already locally stored on one or more of the computing nodes of the DPE service, the routine continues instead to block 540 to identify the computing nodes that already locally store that program data. As discussed in greater detail elsewhere, computing nodes of the DPE service may already locally store the program data for various reasons and in various manners, such as to have one or more computing nodes that store primary copies of portions of the program data (e.g., that were previously used as part of the execution of one or more programs) and/or to have one or more computing nodes that store replicated copies of such program data portions. The routine then continues to block 545 to attempt to identify and select for the cluster any of the identified computing nodes that locally store primary copies of program data portions and that are available for program execution, such as to attempt to select all of the computing nodes of a cluster that were previously used as part of executing one or more programs that used the program data. The routine then continues to block 550 to determine if computing nodes were selected for all of the program data portions, and if so continues to block 585. If it is instead determined in block 550 that one or more program data portions do not yet have selected computing nodes, the routine continues instead to block 555, where the routine attempts to identify and select for the cluster any of the identified computing nodes that locally store replicated copies of the program data portions without selected computing nodes and that are available for program execution. The routine then continues to block 560 to determine if computing nodes are now selected for all of the program data portions, and if so continues to block 585.

If it is instead determined in block 560 that one or more program data portions do not yet have selected computing nodes, the routine continues instead to block 565, where the routine performs one or more other activities to select computing nodes for current or later execution of the program, and then continues to block 585. For example, in some embodiments and situations, the one or more other activities may include, for each of the other program data portions that do not yet have a selected computing node, selecting a computing node that does not locally store the program data portion but is available for current execution, and copying the program data portion to the selected computing node (e.g., from one of the identified computing nodes that locally stores the program data portion but is not currently available, from a remote storage location, etc.). In other embodiments and situations, the one or more other activities may include delaying the start of program execution until computing nodes that already locally store all of the program data portions become available, or taking actions to make particular computing nodes that already locally store program data portions (e.g., the other program data portions that do not yet have a selected computing node) available to execute the program (e.g., by terminating or suspending execution of other programs executing on those computing nodes). It will be appreciated that various other types of other activities may be performed in other embodiments.

In addition, while not illustrated here, in some embodiments and situations, the routine may not be able to currently select computing nodes for current or later execution of the program, and if so may take other actions than continuing to block 585. For example, the routine may instead provide an indication that computing nodes for the cluster are not currently available, so as to prompt the routine 400 to skip block 430 after block 425 ends, optionally along with scheduling a later attempt to perform the distributed program execution. In other embodiments and situations, if a sufficient subset of the cluster computing nodes have been selected (e.g., a minimum threshold, such as at least 90%; computing nodes for particular program data subsets and corresponding execution jobs; etc.), the routine may provide indications of that subset in block 585 for use in initiating a current partial execution of the program, and continue to attempt to later select additional computing nodes for the cluster as they become available. It will be appreciated that various other types of other actions may be taken in other embodiments.

Figure 6:
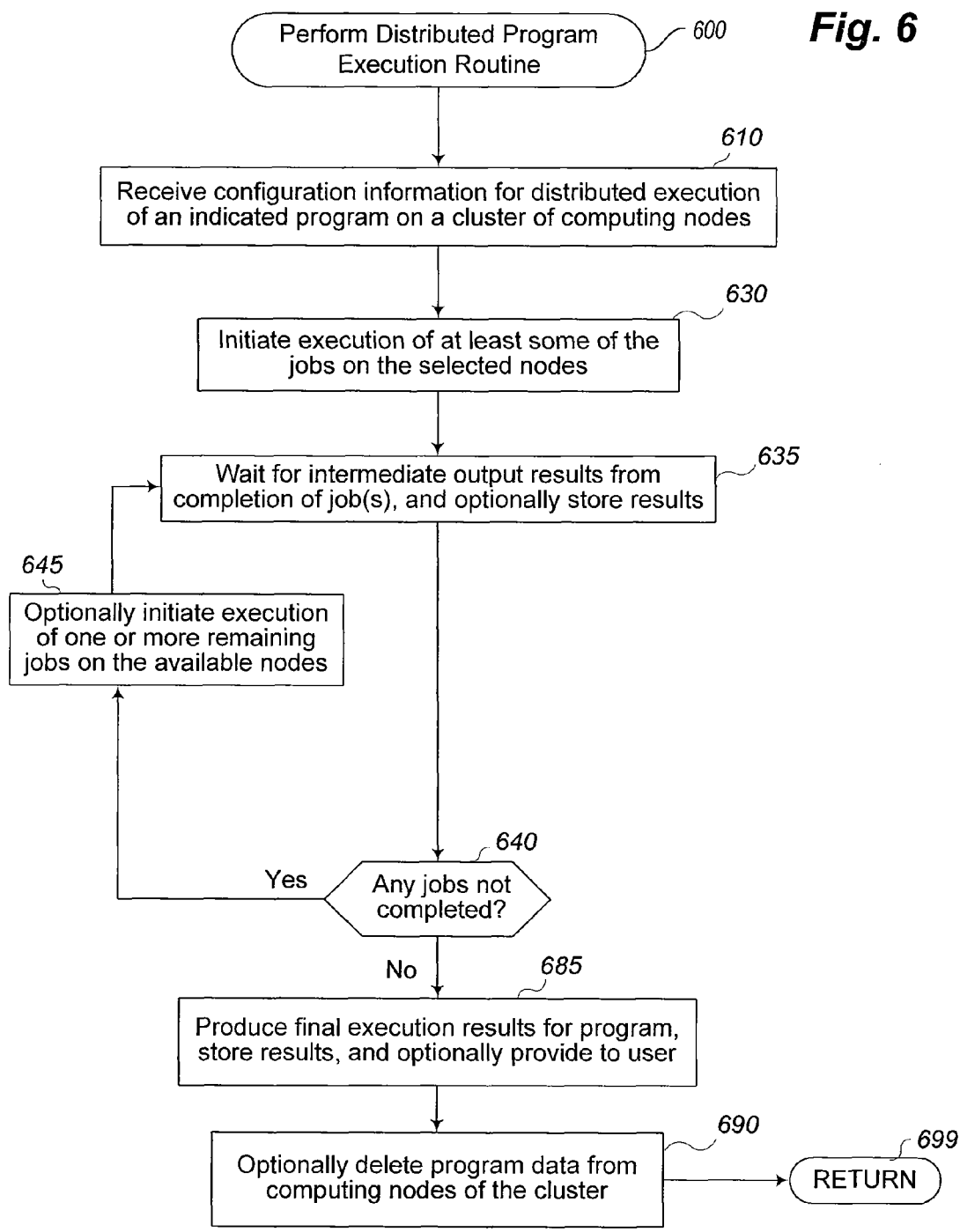
FIG. 6 illustrates a flow diagram of an example embodiment of a routine for performing distributed program execution.

FIG. 6 is a flow diagram of an example embodiment of a Perform Distributed Program Execution routine 600. The routine may be provided by, for example, execution of the DPESSM modules 110 and 180 of FIGS. 1A and 1B, respectively, and/or the DPESSM module 340 of FIG. 3, and may be initiated by block 430 of FIGS. 4A-4B. The routine 600 performs operations to execute indicated programs in a distributed manner on multiple computing nodes in accordance with specified configuration information.

The routine begins in block 610, where it receives program execution configuration information for use in executing an indicated program on a cluster of multiple selected computing nodes, such as from the output of routine 500 of FIG. 5. After block 610, the routine continues to block 630 to initiate the execution of at least some of the execution jobs for the program on the selected computing nodes of the cluster.

After block 630, the routine continues to block 633 to wait for one or more execution jobs to complete and to optionally provide corresponding output data, such as may be used as input data to other execution jobs and/or may be used as part or all of the final results for the execution of the program. In some embodiments, the computing nodes may supply such output information back to the routine 400 (e.g., for storage in a long-term storage location of the DPE service), may locally store such output results on the computing nodes, and/or may store such output results on one or more long-term storage locations remote from the computing nodes. In the illustrated embodiment, blocks 635-645 are illustrated as being performed in a synchronous manner in which the routine 600 waits for execution jobs to complete before performing other actions. It will be appreciated that in other embodiments the routine 600 may operate in other manners, such as in an asynchronous manner to perform other actions with respect to executing the current program and/or to executing other programs for other users. In addition, it will be appreciated that in some situations errors may occur that cause one or more execution jobs to fail to complete, such as due to problems with the computing node on which the execution job is being performed, due to a network connection with the computing node, due to an error in the software corresponding to performing the execution job, due to problems with input data to be used for the performance of the execution job, etc. In such situations, the routine may take various actions to correct the errors (e.g., by transferring the execution job to another computing node), but if an irreversible error occurs, the routine may terminate the further distributed execution of the program or may instead attempt to complete as much of the distributed execution of the program as possible and provide incomplete final results along with an indication that the program executed is completed with errors.

In the illustrated example routine 600, after one or more execution jobs are determined in block 635 to be completed, the routine continues to block 640 to determine whether there are more execution jobs to be executed and/or to be completed. If so, the routine continues to block 645 to optionally initiate execution of one or more remaining execution jobs on the available computing nodes of the cluster, such as if those remaining execution jobs were waiting for output data from one or more of the completed execution jobs, or if instead there are more execution jobs than computing nodes and the newly available computing nodes from the completion of the other execution jobs performance are now used to execute remaining execution jobs. After block 645, the routine returns to block 635 to wait for completion of other execution jobs.

If it is instead determined in block 640 that all of the execution jobs have completed, the routine continues to block 685 to produce final execution results for the program, and to optionally store those final results and/or provide them to the user (e.g., in addition to locally storing those final results on the computing nodes). The final execution results may be generated or otherwise produced in various manners in various embodiments, such as by combining output results from multiple execution jobs in various ways, selecting the output results from a single execution job to use, etc. After block 685, the routine continues to block 690 to optionally delete some or all program data from computing nodes of the cluster (e.g., input data, intermediate data, generated final results, etc.), while in some embodiments and situations some or all such program data may instead be retained on the computing nodes (e.g., if the local storage on the computing nodes is not yet needed for other purposes, if the user has selected to maintain the cluster of computing nodes for later use, etc.). After block 690, the routine continues to block 699 and returns.

Figure 7:
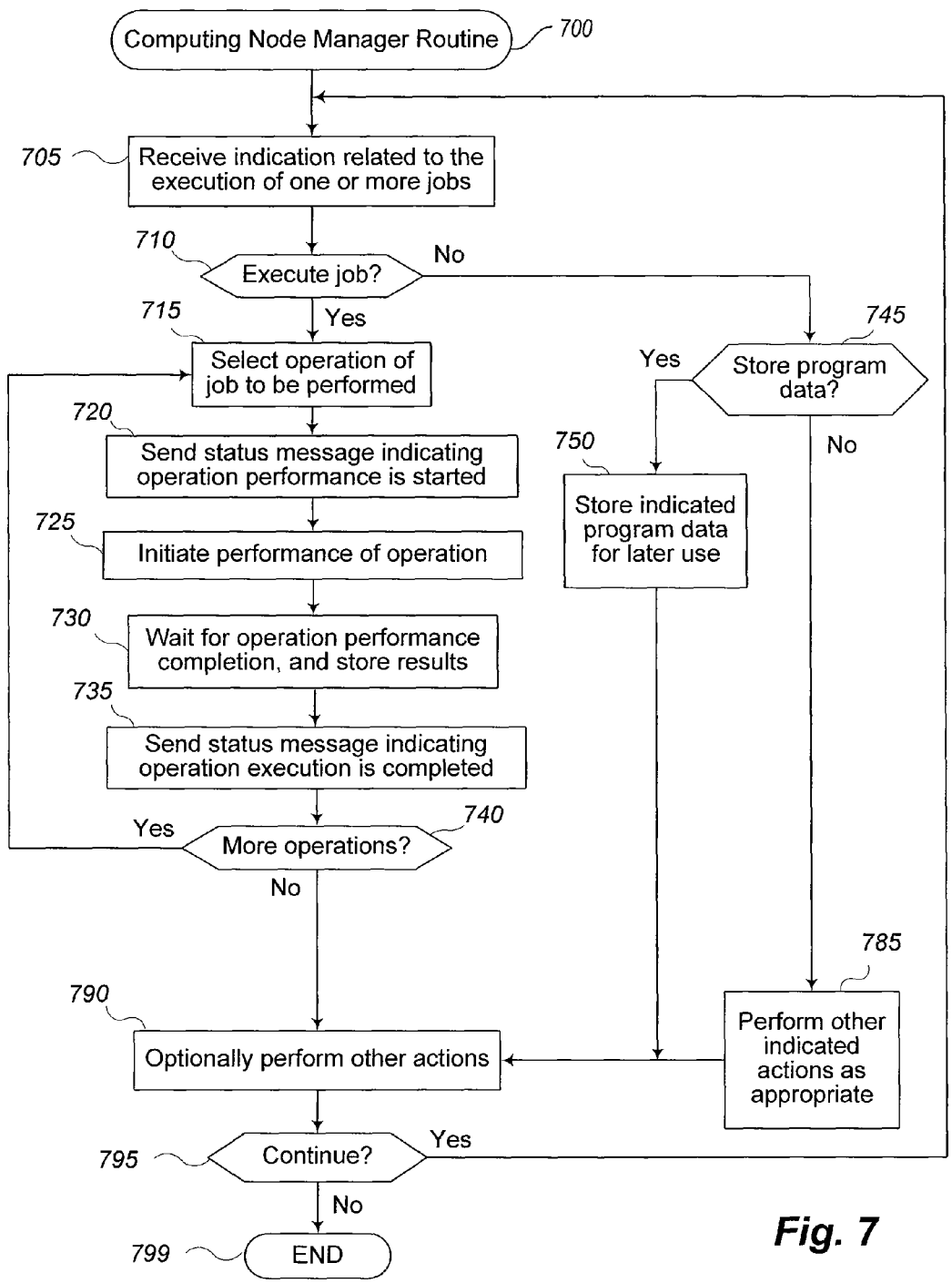
FIG. 7 illustrates a flow diagram of an example embodiment of a Computing Node Manager routine.

FIG. 7 is a flow diagram of an example of a Computing Node Manager routine 700. The routine may be provided by, for example, execution of module 179 of FIG. 1B, or of other management software executing on computing nodes 120 of FIG. 1A, computing systems 182, 183, 175 and 150 of FIG. 1B, computing nodes 360 of FIG. 3, etc. In the illustrated embodiment, the management software on a computing node manages some aspects of the execution of execution jobs on the computing node, while in other embodiments some or all of the functionality described with respect to FIG. 7 may instead be performed by the System Manager routine 400 of FIGS. 4A-4B, or instead by an execution job that is being executed on the computing node.

In the illustrated embodiment, the routine begins at block 705, where an indication is received related to the execution of one or more execution jobs on the computing node. The routine continues to block 710 to determine whether the indication is to initiate execution of an indicated execution job. If so, the routine determines the multiple operations to be performed for the execution job (e.g., based on the information received about the execution job in block 705 or that is otherwise retrieved from an external source), and continues to block 715 to select the next operation to be performed, beginning with the first. Blocks 715-740 are illustrated in this example embodiment as being performed in a serial manner, such that each operation is individually performed in a synchronous manner before the next operation is initiated, although it will be appreciated that in other embodiments the operations may be performed in other manners, such as to execute some or all of the operations in parallel and/or in an asynchronous manner.

After block 715, the routine continues to block 720 to send a status message to the routine 400 indicating that the execution of the selected operation has begun, and in block 725 initiates the performance of the operation. In block 730, the routine waits for the completion of the performance of the operation, and optionally locally stores any intermediate results produced by the operation performance. In block 735, the routine then sends another status message to the routine 400 indicating that the performance of the operation is completed. In block 740, the routine then determines whether there are more operations to be performed, and if so returns to block 715.

If was instead determined in block 710 that the received indication in block 705 was not to execute an execution job, the routine continues to block 745 to determine whether the received indication in block 705 is to store input data or other data for use by execution of one or more programs, such as may be initiated by blocks 425 and/or 490 of FIGS. 4A-4B and/or block 565 of FIG. 5. If so, the routine continues to block 750 to locally store indicated data, such as data received in block 705 and/or retrieved in block 750 from a location indicated in block 705 (e.g., another computing node, a remote location external to the computing nodes, etc.).

If was instead determined in block 745 that the received indication in block 705 was not to store program data, the routine continues instead to block 785 to perform one or more other indicated operations as appropriate. For example, the information received in block 705 may be a request for status information from the routine 400, and if so block 785 may obtain and provide that status information to the routine 400. Alternatively, the information in block 705 may be an indication to terminate execution of the execution job, and the actions performed in block 785 may include corresponding actions. In addition, actions performed with respect to block 785 may include a request from the routine 400 to initiate persistent storage of indicated data, and if so the actions in block 785 may include performing such actions. Furthermore, in some embodiments and situations, different execution jobs may coordinate in various manners, such as by exchanging information of interest, and the information in block 705 may be such information from another execution job of the program or a request from such other execution job for information from the current execution job.

After blocks 750 or 785, or if it is instead determined in block 740 that there are no more operations to be performed, the routine continues to block 790 to optionally perform one or more other tasks, such as to coordinate with other execution jobs of the program if appropriate, to take administrative actions as part of executing the execution job, etc. After block 790, the routine continues to block 795 to determine whether to continue, such as until an explicit indication to terminate is received (e.g., from the routine 400 or from a human operator of the DPE service). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners.

Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
    receiving, by one or more computing systems configured to provide a program execution service that executes programs for multiple users by using a plurality of computing nodes provided by the program execution service, configuration information regarding using indicated input data as part of executing an indicated program for a first user of the multiple users in a distributed manner on a computing node cluster;
    selecting, by the one or more configured computing systems, multiple computing nodes from the plurality for the computing node cluster based at least in part on the selected multiple computing nodes each being identified as locally storing at least some of the indicated input data prior to the receiving of the configuration information;
    determining, by the one or more configured computing systems and based on at least one of the selected multiple computing nodes being currently unavailable to perform the executing of the indicated program due to executing one or more other programs for one or more other users and based on the executing of the indicated program being determined to have a higher priority than the executing of the one or more other programs, to terminate the executing of the one or more other programs on the at least one selected computing node to enable use of the at least one selected computing node in the executing of the indicated program; and
    initiating, by the one or more configured computing systems and based at least in part on the terminating of the executing of the one or more other programs on the at least one selected computing node, the executing of the indicated program on the selected multiple computing nodes using the locally stored at least some indicated input data.

2. The method of claim 1 wherein the initiating of the executing of the indicated program on the selected multiple computing nodes includes, for each of the multiple computing nodes, initiating use of the at least some indicated input data that is locally stored on the computing node as input for the executing of the indicated program on the computing node.

3. The method of claim 1 wherein the receiving of the configuration information includes receiving a request from the first user to perform the executing of the indicated program and includes receiving access to the indicated input data.

4. The method of claim 1 wherein the selecting of the multiple computing nodes for the computing node cluster includes selecting an additional computing node for the computing node cluster that does not already locally store any of the indicated input data prior to the receiving of the configuration information, and initiating local storing, on a local storage device of the additional computing node, of some or all of the indicated input data for use as part of the executing of the indicated program on the additional computing node.

5. The method of claim 4 wherein the initiating of the local storing of the some or all indicated input data on the local storage device includes copying the some or all indicated input data from at least one storage node remote from the selected multiple computing nodes.

6. The method of claim 4 wherein the initiating of the local storing of the some or all indicated input data on the local storage device of the additional computing node includes attaching a non-local data storage volume to the additional computing node and copying the some or all indicated input data from the attached non-local data storage volume to the local storage device, the non-local data storage volume being provided by a remote storage service.

7. The method of claim 1 wherein the initiating of the executing of the indicated program on the selected multiple computing nodes includes, for an additional computing node that locally stores some or all of the indicated input data and that is executing another program, delaying use of the additional computing node for the computing node cluster until the executing of the another program has ended.

8. The method of claim 1 wherein executing of the indicated program begins and is temporarily suspended before the selecting of the multiple computing nodes, and wherein the selecting of the multiple computing nodes is performed as part of resuming the temporarily suspended execution of the indicated program.

9. The method of claim 1 wherein the received configuration information further includes one or more indicated criteria that the selected multiple computing nodes are to satisfy, and wherein the selecting of the multiple computing nodes is further performed to satisfy the one or more indicated criteria.

10. The method of claim 1 further comprising identifying that one or more additional computing nodes are available at a future time to participate in the computing node cluster for performing the executing of the indicated program, and initiating use of the one or more additional computing nodes in the computing node cluster at the future time.

11. The method of claim 1 wherein the program execution service provides each of the selected multiple computing nodes as a virtual machine hosted by a physical computing system.

12. A non-transitory computer-readable medium having stored contents that configure a computing system to:
receive information that indicates a program to be executed for a first user by a program execution service on multiple computing nodes using indicated input data;
identify, by the configured computing system, one or more computing nodes for executing the indicated program based at least in part on the one or more computing nodes already storing at least some of the indicated input data and being available for performing the executing of the indicated program, the identified one or more computing nodes being selected from a plurality of computing nodes used by the program execution service for executing programs;
initiate, by the configured computing system, the executing of the indicated program on the identified one or more computing nodes so as to use the already stored at least some indicated input data; and
initiate, by the configured computing system, the executing of the indicated program on an additional computing node that is identified as already storing at least some of the indicated input data, the initiating of the executing of the indicated program on the additional computing node including terminating execution of another program on the additional computing node for another user to enable the additional computing node to be available to perform the executing of the indicated program.

13. The non-transitory computer-readable medium of claim 12 wherein the received information is configuration information from the first user that includes an indication of a quantity of the multiple computing nodes, and wherein the executing of the indicated program is performed on a cluster of multiple computing nodes of the indicated quantity that include the identified one or more computing nodes and the additional computing node.

14. The non-transitory computer-readable medium of claim 12 wherein the configured computing system is part of the program execution service, wherein the first user is one of multiple users of the program execution service on whose behalf multiple programs are executed, and wherein the stored contents include executable software instructions.

15. The non-transitory computer-readable medium of claim 12 wherein the receiving of the information includes receiving a request for the program execution service to execute the indicated program, wherein the identifying of the one or more computing nodes is further based at least in part on the one or more computing nodes storing the at least some indicated input data before the receiving of the request, and wherein the stored contents further configure the computing system to select a further computing node for use in the executing the indicated program and to initiate local storing, on one or more local storage devices of the selected further computing node, of some or all of the indicated input data for use as part of the executing of the indicated program on the selected further computing node.

16. The non-transitory computer-readable medium of claim 12 wherein executing of the indicated program begins and is temporarily suspended before identifying of the one or more computing nodes, and wherein the identifying of the one or more computing nodes is performed as part of resuming the temporarily suspended execution of the indicated program and includes selecting at least one computing node that was used for the executing of the indicated program before the executing was temporarily suspended.

17. The non-transitory computer-readable medium of claim 12 wherein the stored contents further configure the computing system to determine that the identified one or more computing nodes are available for performing the executing of the indicated program at a future time, and wherein the initiating of the executing of the indicated program on the identified one or more computing nodes is performed at the future time.

18. A system comprising:
one or more processors of one or more computing systems; and
one or more components of a program execution service that, when executed by at least one of the one or more processors, cause the at least one processor to:
receive a request to execute, for a first user that is one of multiple users for which the program execution service executes programs by using a plurality of computing nodes provided by the program execution service, an indicated program using indicated input data;

select multiple computing nodes from the plurality to use for executing the indicated program based on the multiple computing nodes already storing at least some of the indicated input data before the receiving of the request;

determine that at least one of the selected multiple computing nodes is currently unavailable to perform the executing of the indicated program due to executing one or more other programs for one or more other users, that the executing of the indicated program on the at least one selected computing node is preferred for the program execution service, and to terminate the executing of the one or more other programs on the at least one selected computing node to enable use of the at least one selected computing node in the executing of the indicated program; and initiate, based at least in part on the terminating of the executing of the one or more other programs on the at least one selected computing node, the executing of the indicated program on the multiple computing nodes to cause to cause use of the already stored at least some indicated input data during the executing of the indicated program.

19. The system of claim 18 wherein the one or more components include software instructions that further configure the one or more components to provision the selected multiple computing nodes to prepare the provisioned selected multiple computing nodes to perform the executing of the indicated program.

20. The system of claim 18 wherein the received request includes configuration information indicated by the first user.

21. The system of claim 18 wherein the selected multiple computing nodes further include one or more additional computing nodes that do not already store at least some of the indicated input data, and wherein the one or more components are further configured to initiate local storing, on one or more local storage devices of the one or more additional computing nodes, of some or all of the indicated input data for use as part of the executing of the indicated program on the one or more additional computing nodes.

22. The system of claim 18 wherein executing of the indicated program begins and is temporarily suspended before the selecting of the multiple computing nodes, and wherein the initiating of the executing of the indicated program on the selected multiple computing nodes is performed as part of resuming the temporarily suspended execution of the indicated program.

* * * * *